(12) United States Patent
Bentley et al.

(10) Patent No.: US 9,721,165 B1
(45) Date of Patent: Aug. 1, 2017

(54) VIDEO MICROSUMMARIZATION

(71) Applicant: Amazon Technologies, Inc., Seattle, WA (US)

(72) Inventors: Peter Van Tuyl Bentley, Seattle, WA (US); Matthew Alan Townsend, Redwood City, CA (US); Manlio Armando Lo Conte, Seattle, WA (US); Mark Eugene Pearson, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/940,993

(22) Filed: Nov. 13, 2015

(51) Int. Cl.
G06K 9/00 (2006.01)
G06K 9/52 (2006.01)
G11B 27/034 (2006.01)

(52) U.S. Cl.
CPC ..... G06K 9/00751 (2013.01); G06K 9/00758 (2013.01); G06K 9/00765 (2013.01); G06K 9/52 (2013.01); G11B 27/034 (2013.01)

(58) Field of Classification Search
CPC ............ G06Q 10/101; G06F 17/30958; G06F 9/5038; G06F 8/34; H04N 21/8133
See application file for complete search history.

(56) References Cited

U.S. PATENT DOCUMENTS

| | | | | |
|---|---|---|---|---|
| 2007/0124292 | A1* | 5/2007 | Kirshenbaum | G06F 17/30032 |
| 2011/0314367 | A1* | 12/2011 | Chang | G06F 17/30035 715/230 |
| 2012/0089552 | A1* | 4/2012 | Chang | G06F 17/30817 706/52 |
| 2013/0326406 | A1* | 12/2013 | Reiley | G06F 3/048 715/810 |
| 2014/0153902 | A1* | 6/2014 | Pearson | G06F 17/30 386/241 |
| 2014/0169679 | A1* | 6/2014 | Harada | H04N 21/251 382/195 |
| 2014/0321831 | A1* | 10/2014 | Olsen | G11B 27/034 386/241 |
| 2015/0217196 | A1* | 8/2015 | McCarthy | A63F 13/497 463/24 |

* cited by examiner

*Primary Examiner* — Hung Dang
*Assistant Examiner* — Sunghyoun Park
(74) *Attorney, Agent, or Firm* — Pierce Atwood LLP

(57) ABSTRACT

A system and method for generating a short video summary from video data. For example, the system may receive input video data including video clips and may select snippets from each video clip to include in the short video summary. To select a snippet, the system may calculate a priority metric for individual frames in a video clip, may generate a priority metric graph for the video clip and may select a portion of the video clip associated with a peak of the priority metric graph. Thus, the snippets may include a short duration of time (e.g., 1-4 seconds) corresponding to the peak of the priority metric graph. The system may reorder the snippets based on characteristics of content represented in the snippet.

19 Claims, 29 Drawing Sheets

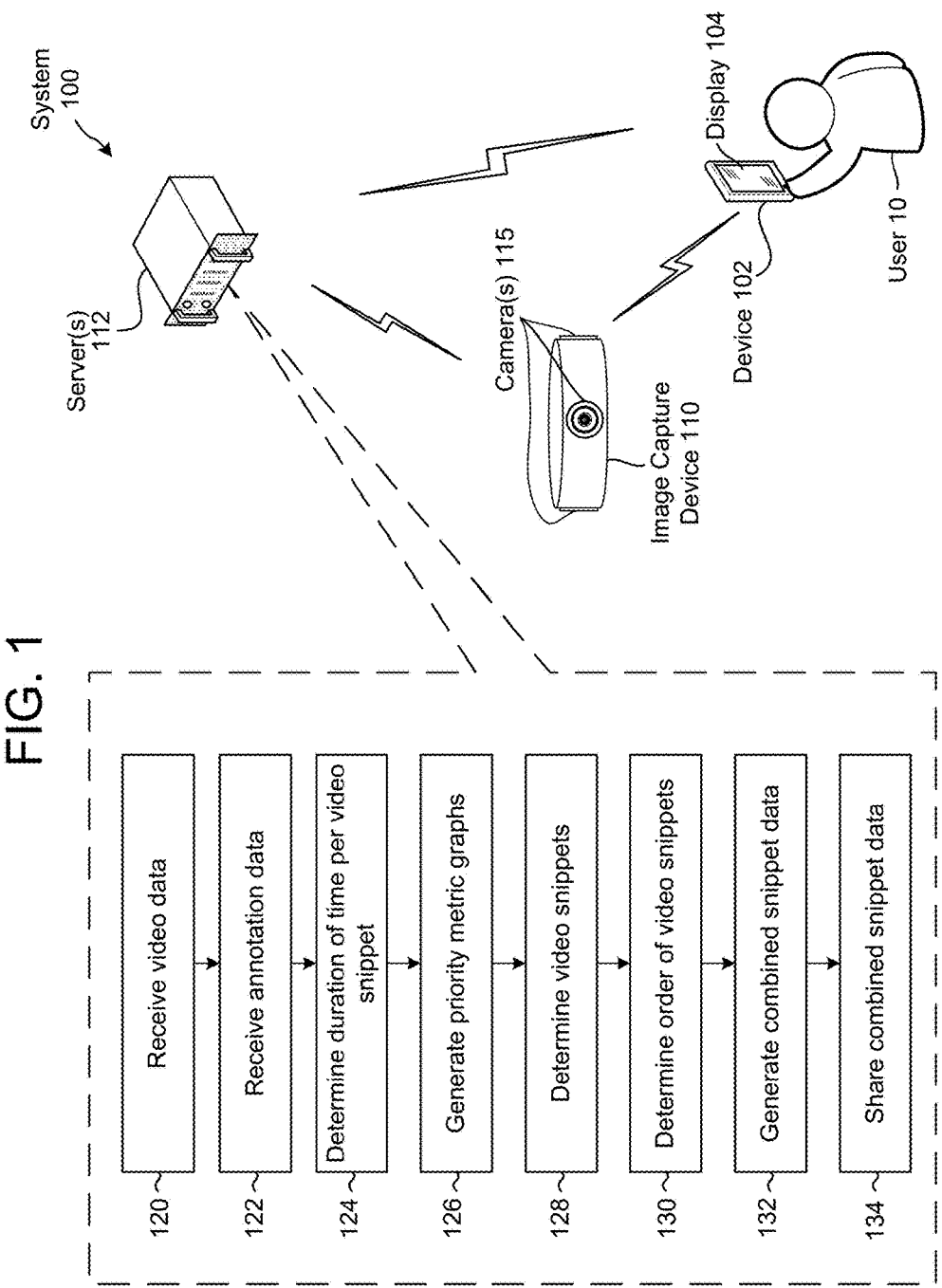

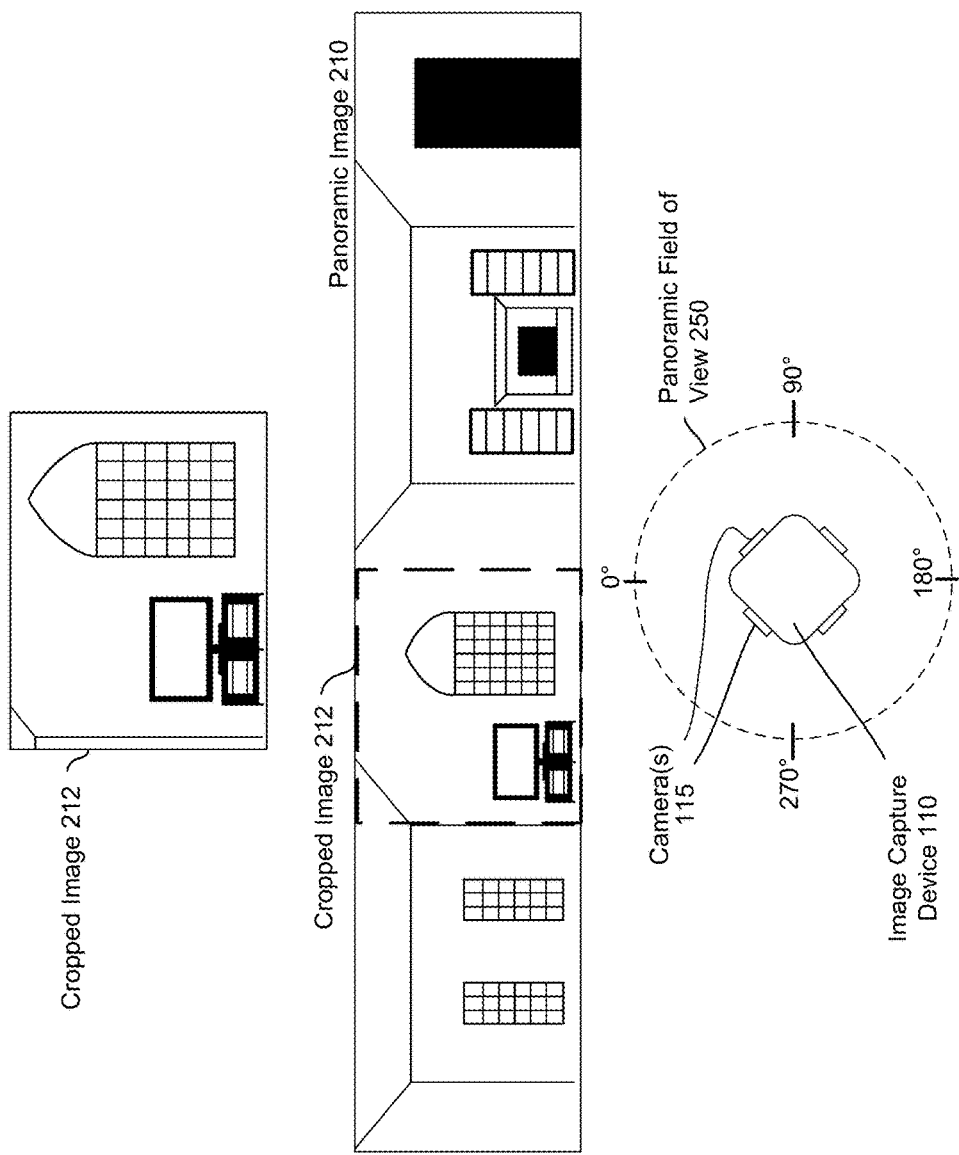

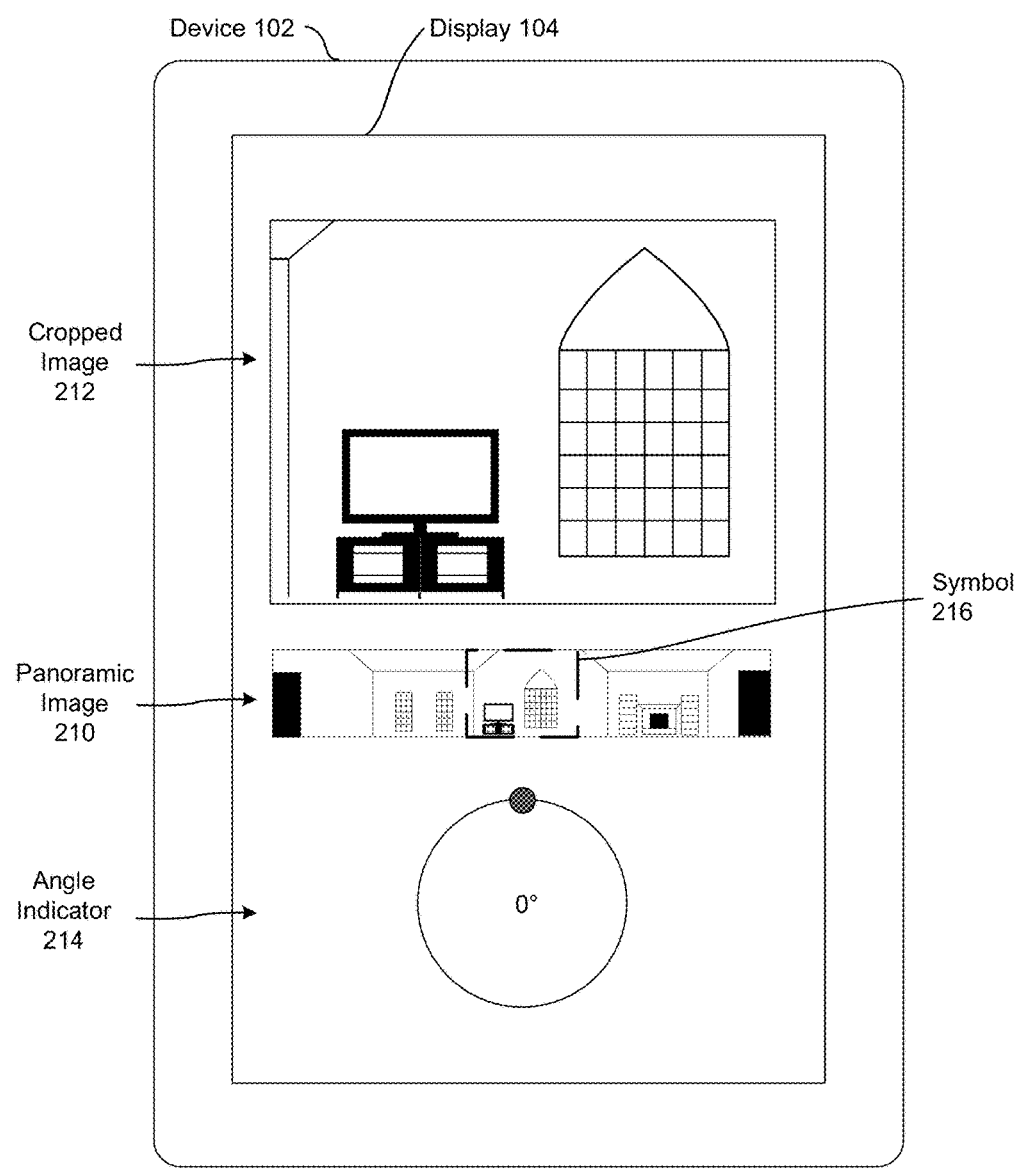

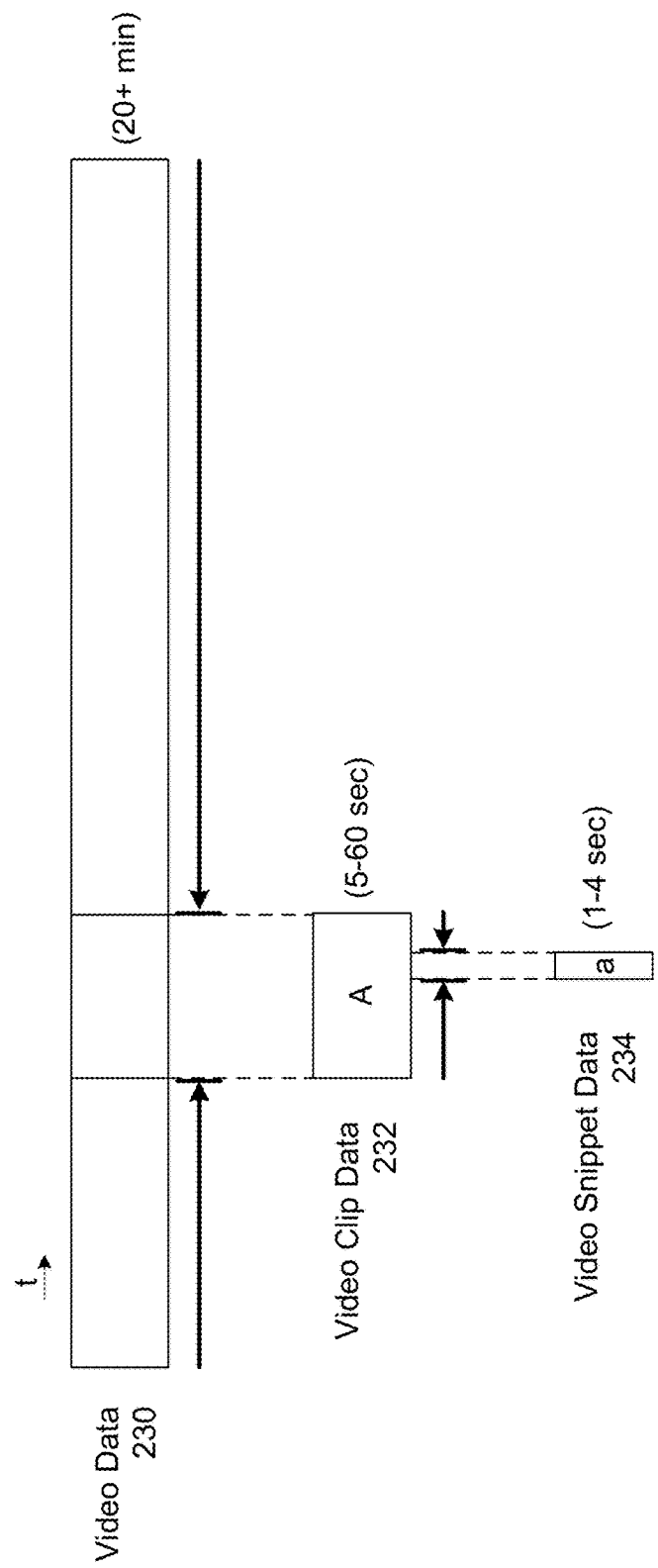

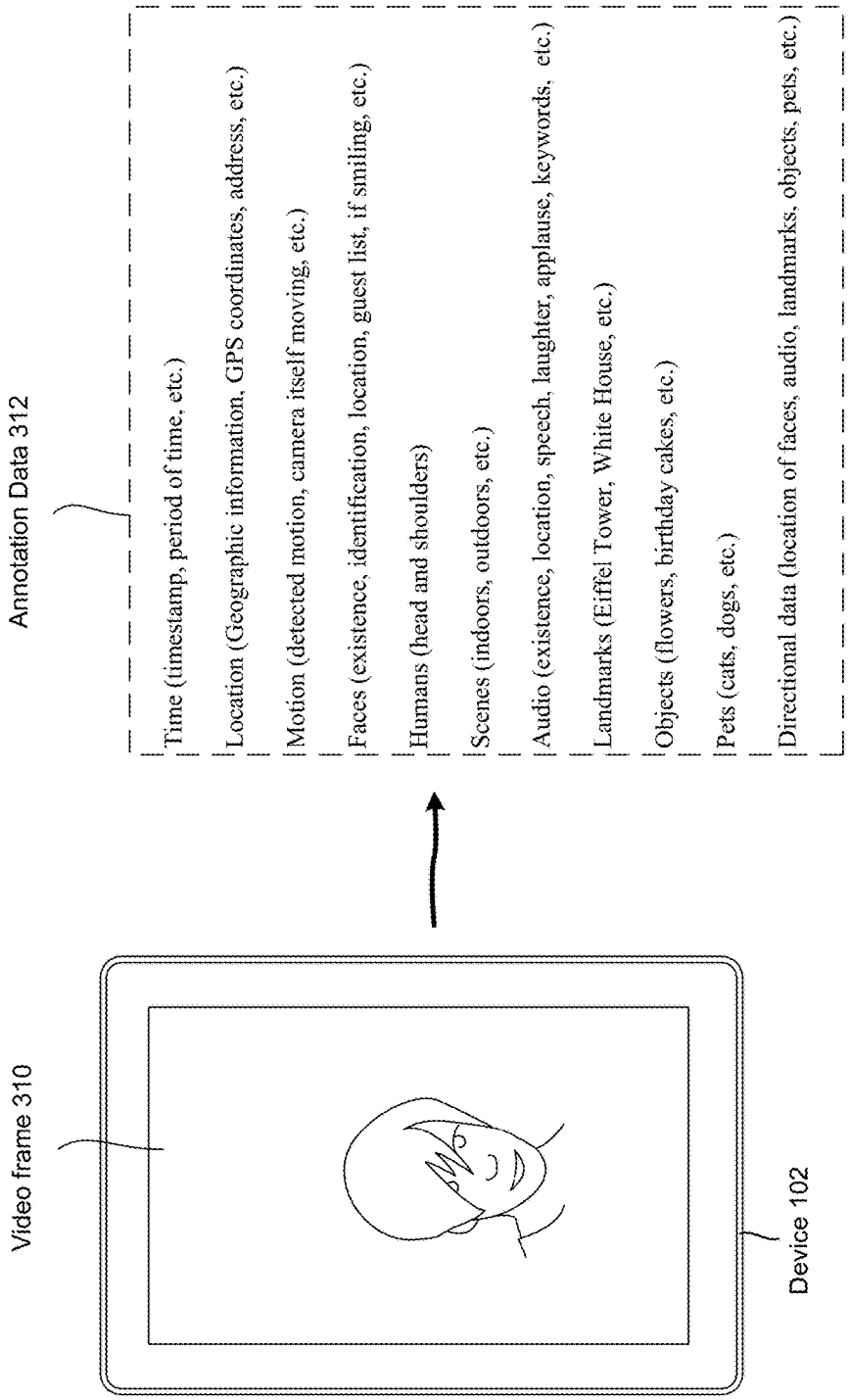

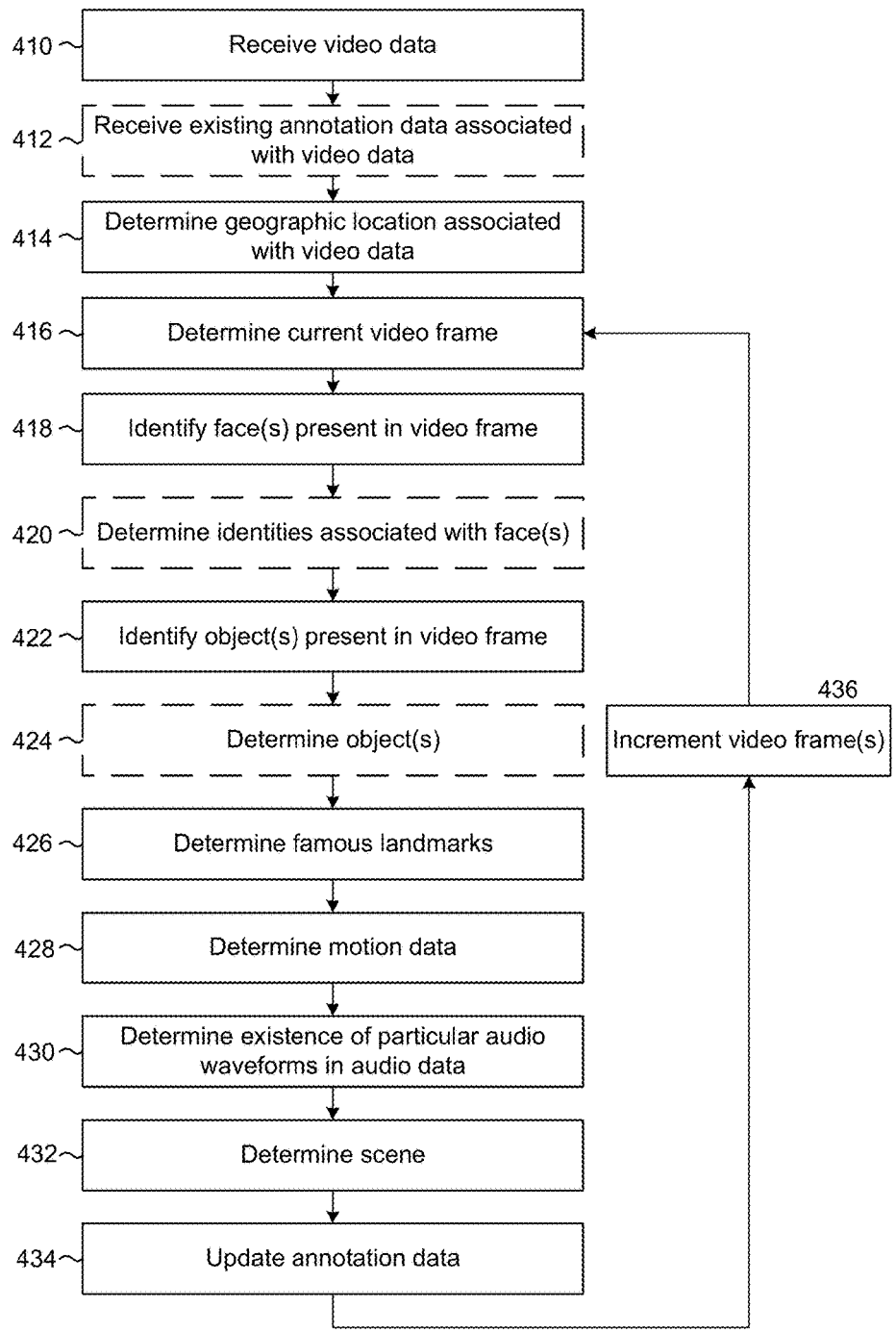

FIG. 5A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 510

FIG. 5C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 514

FIG. 5D

| Clip | Frames Included | Priority Metric | Summary Data | Time/Position of interesting moments |
|---|---|---|---|---|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 520

FIG. 5E

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 522

FIG. 5F

| Summary Data | Group 1 | Group 2 | Group 3 | Group 4 | Group 5 |
|---|---|---|---|---|---|
| Face 1 | | | | | |
| Face 2 | | | | | |
| Scene 1 | | | | | |
| Scene 2 | | | | | |
| Object 1 | | | | | |
| Object 2 | | | | | |
| Frame selector statistic(s) identifying transitions, Frame similarity index, etc. | | | | | |

Detection Results Database 530

FIG. 6

| Characteristic | Weighting for Video Clip | Weighting for Video Snippet |
|---|---|---|
| Characteristic 1 | | |
| Characteristic 2 | | |
| Characteristic 3 | | |
| Characteristic 10 | | |
| Characteristic 11 | | |
| Characteristic 30 | | |
| Characteristic 35 | | |

Weighting Matrix 610

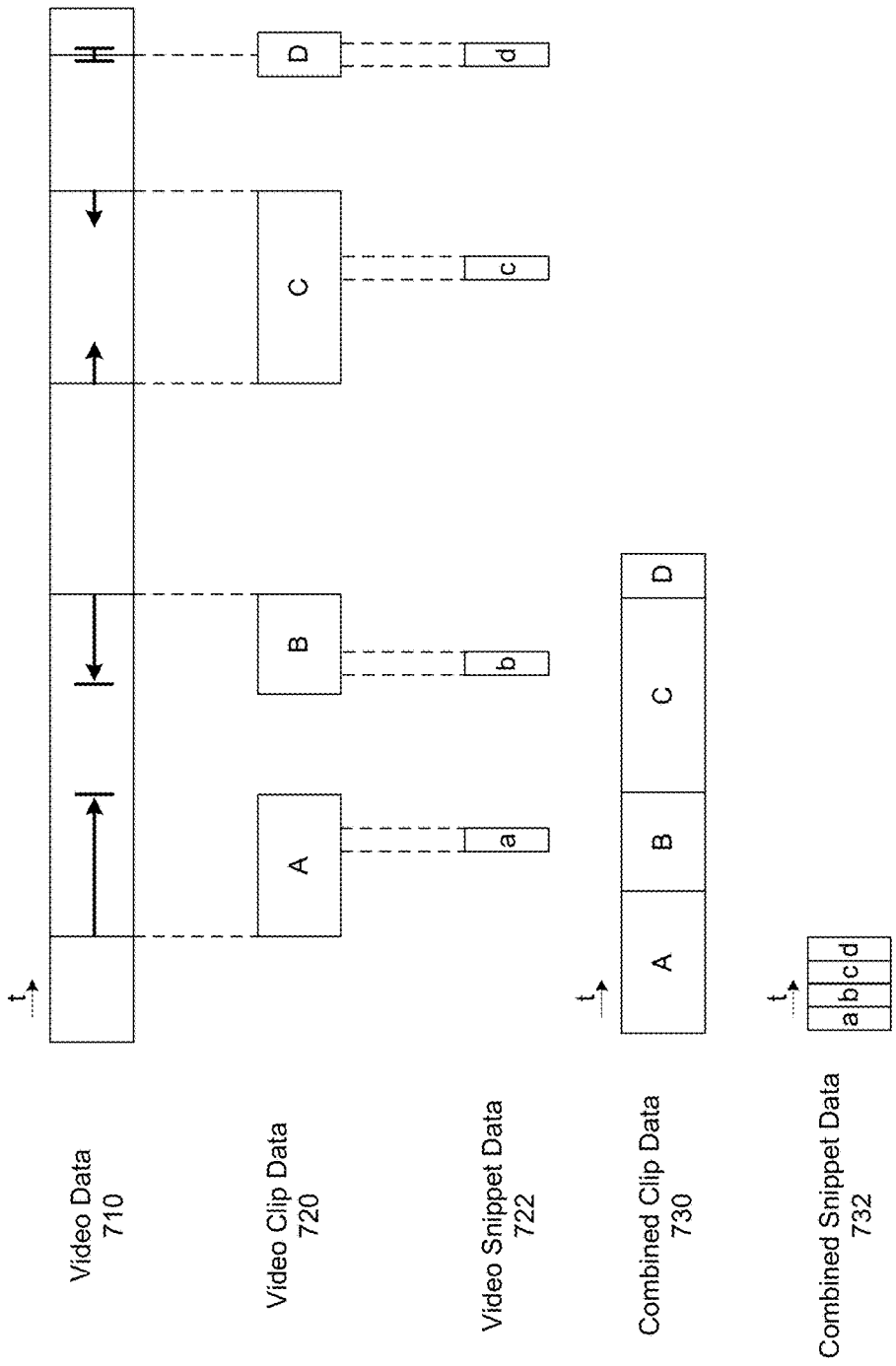

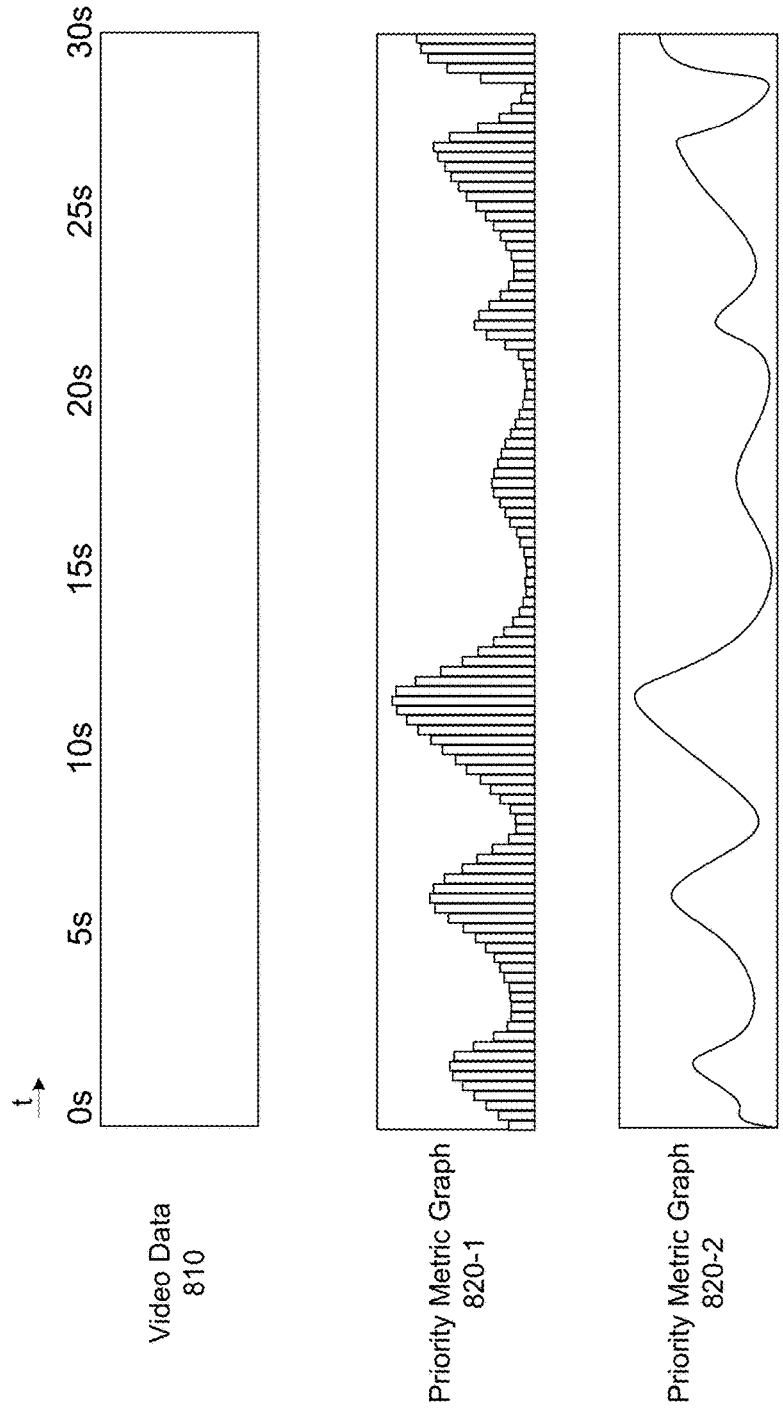

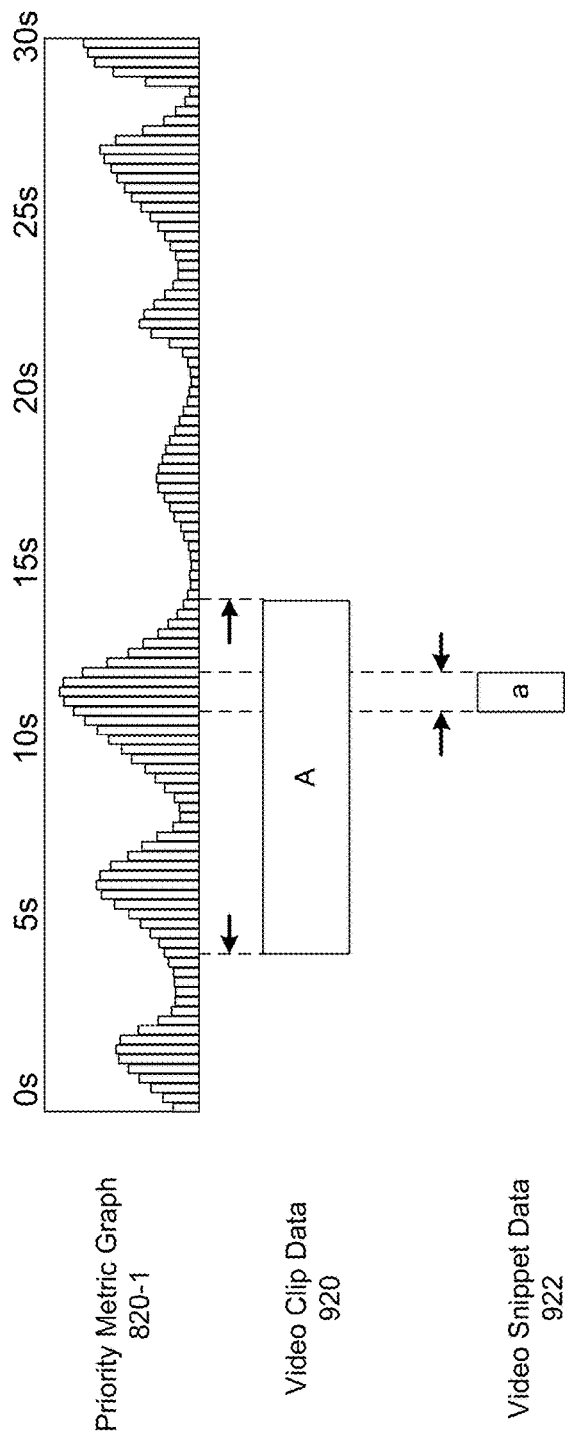

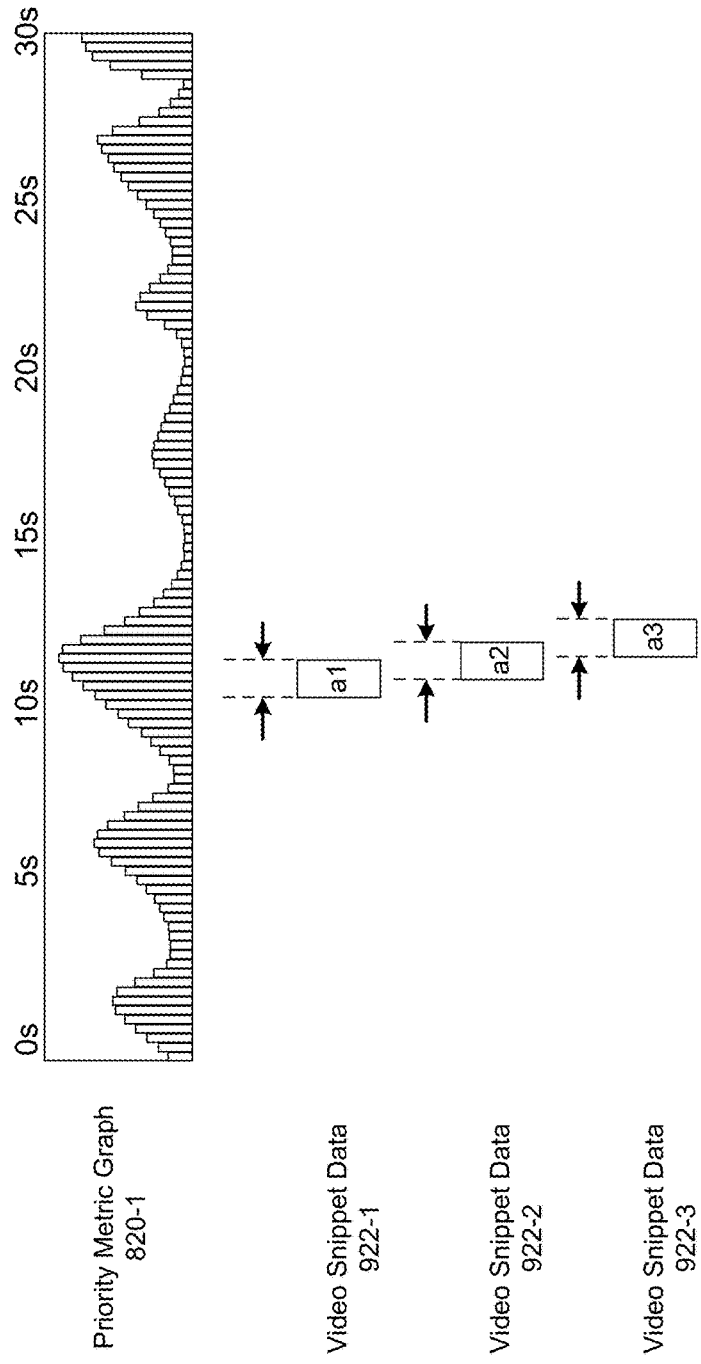

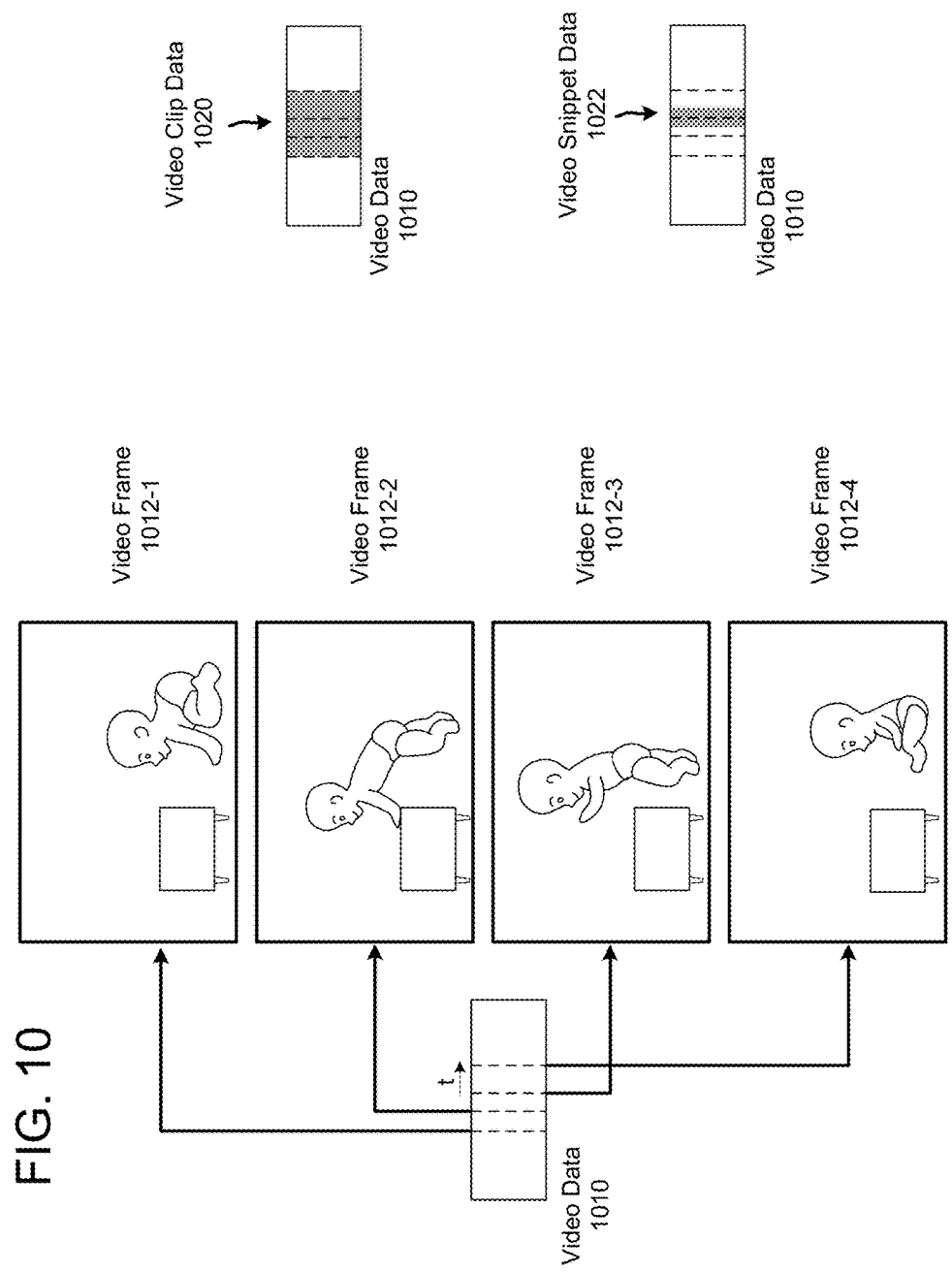

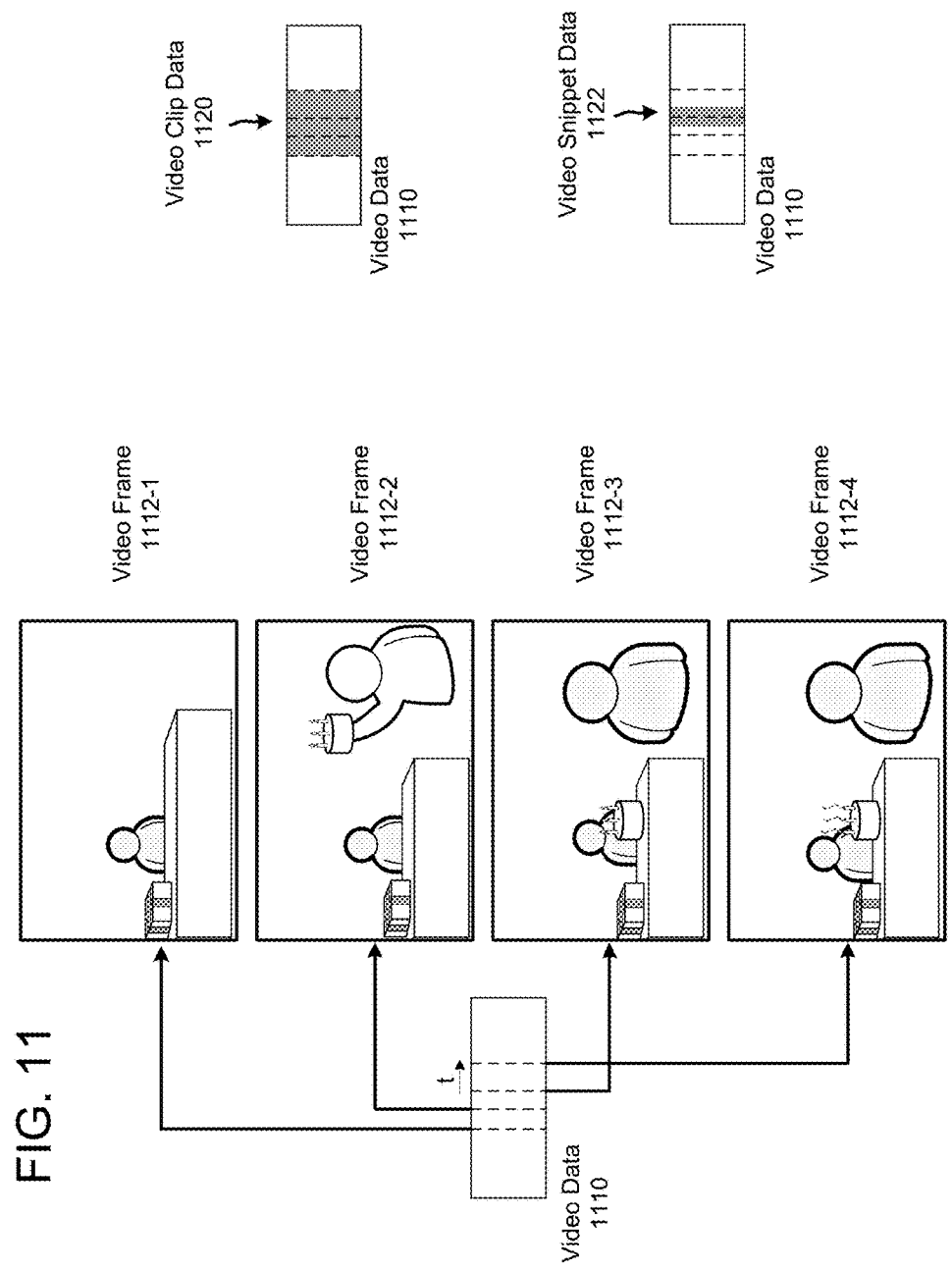

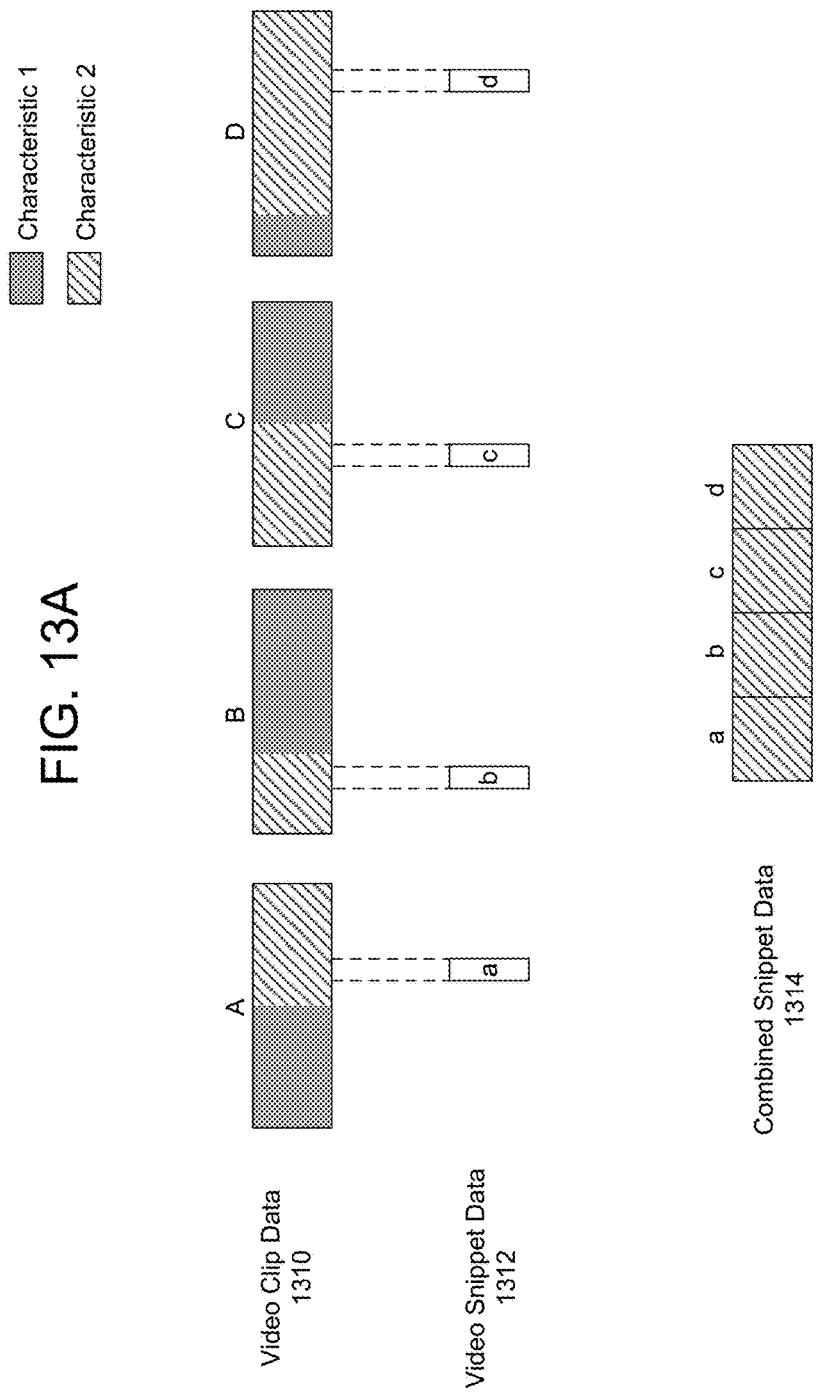

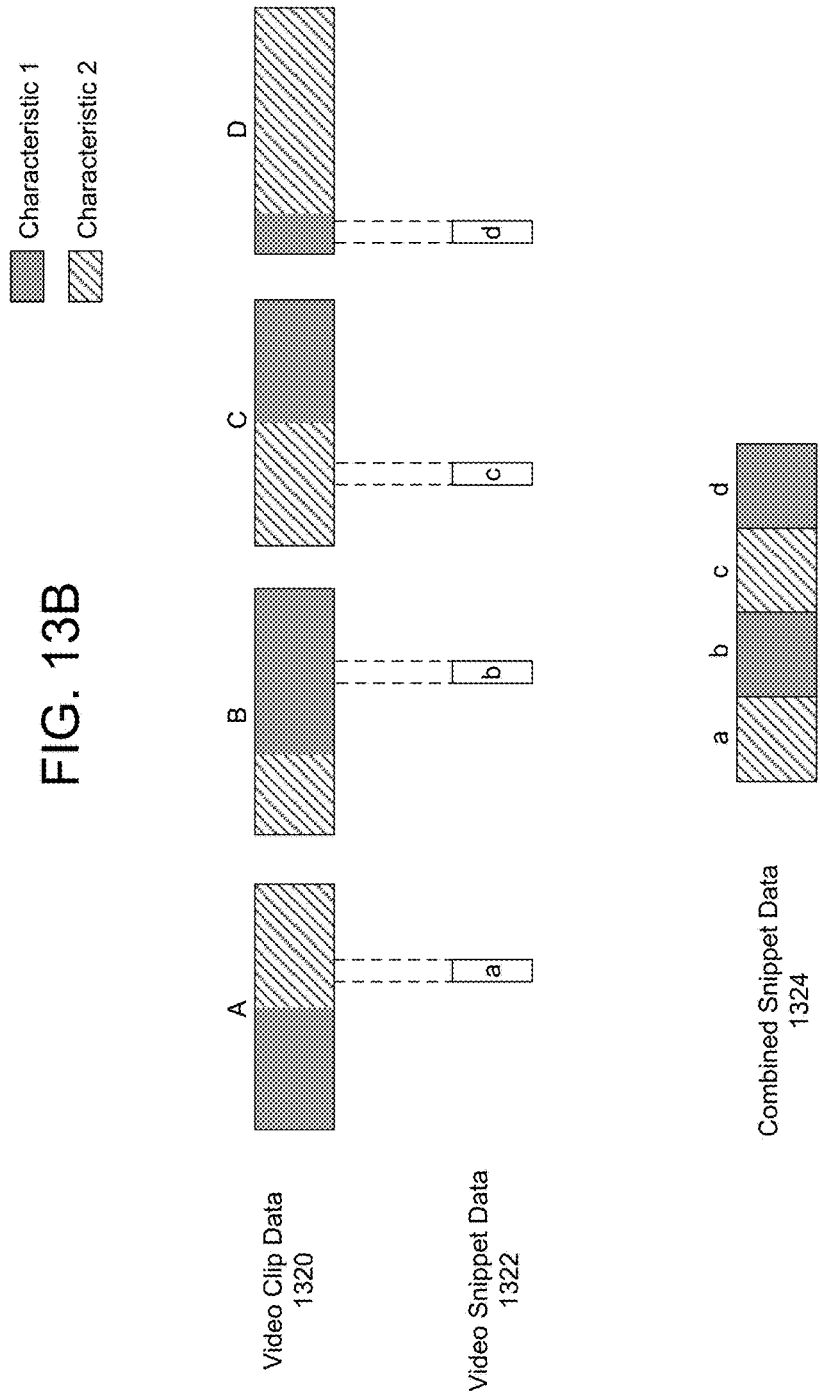

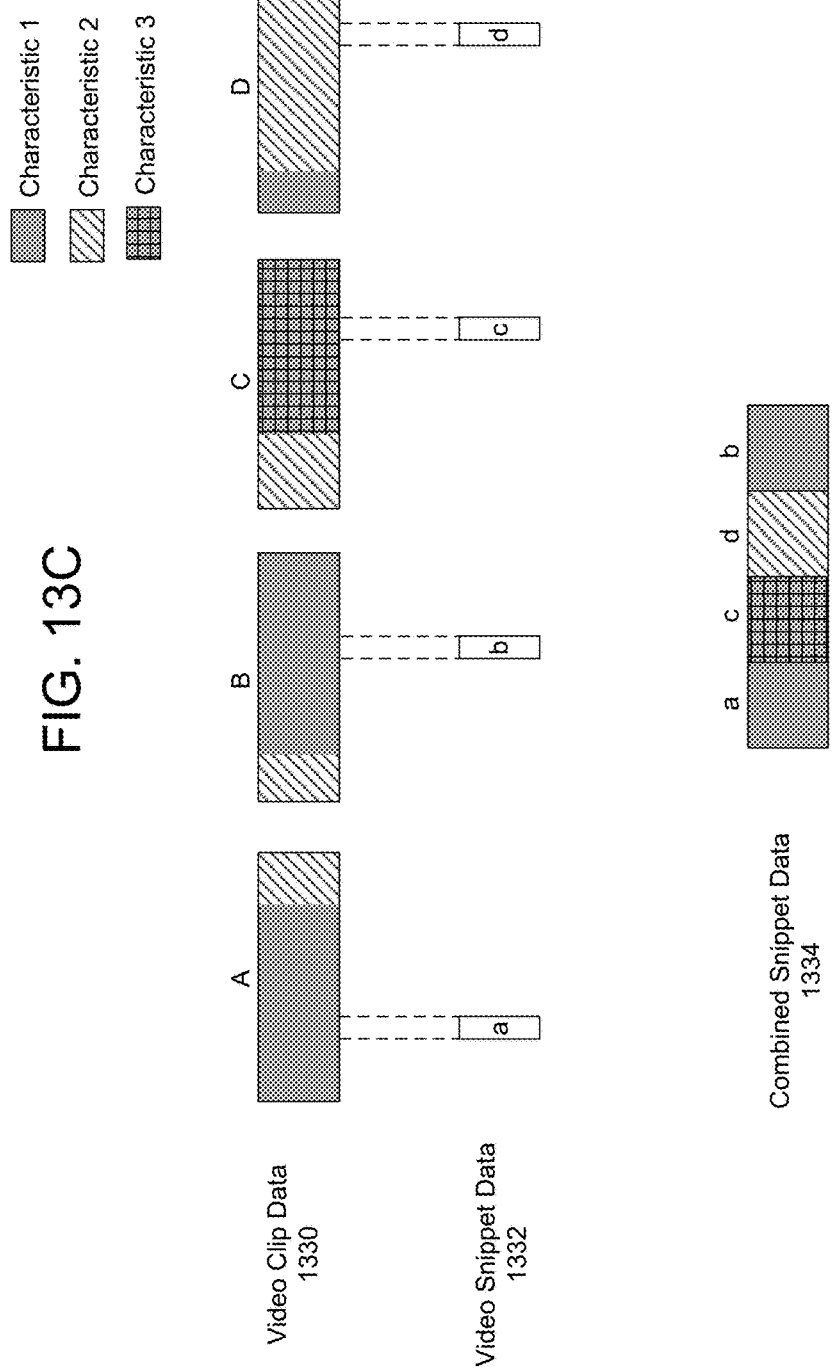

VIDEO MICROSUMMARIZATION

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIG. 1 illustrate overviews of systems for implementing embodiments of the present disclosure.

FIGS. 2A-2C illustrate examples of cropping video data in time and space according to embodiments of the present disclosure.

FIG. 3 illustrates an example of annotation data according to embodiments of the present disclosure.

FIG. 4 is a flowchart conceptually illustrating an example method for generating annotation data according to embodiments of the present disclosure.

FIGS. 5A-5H illustrate examples of an annotation database, a master clip table and moments according to embodiments of the present disclosure.

FIG. 6 illustrates an example of different weighting for determining priority metrics associated with video snippets and video clips according to embodiments of the present disclosure.

FIG. 7 illustrates an example of generating combined clip data and combined snippet data according to embodiments of the present disclosure.

FIG. 8 illustrates examples of priority metric graphs according to embodiments of the present disclosure.

FIGS. 9A-9B illustrate examples of selecting a peak in a priority metric graph according to embodiments of the present disclosure.

FIG. 10 illustrates an example of video clip data and video snippet data according to embodiments of the present disclosure.

FIG. 11 illustrates an example of video clip data and video snippet data according to embodiments of the present disclosure.

FIG. 13A-13C illustrate examples of ordering video snippets according to embodiments of the present disclosure.

DETAILED DESCRIPTION

Figure 5B:

Electronic devices are commonly used to capture video data. The devices may capture video data over a lengthy period of time and some devices may capture a wide field of view in order to capture a wide area. Therefore, the video data may benefit from video editing prior to being displayed and/or shared via social networking. Video editing, such as extracting video clips, cropping the video data, video summarization, or the like, may be performed automatically without user intervention. However, videos shared via some social networks (e.g., Vine, Snapchat, Instagram or the like) are length-restricted to a short duration of time (e.g., 6 seconds, 10 seconds, 15 seconds or the like). Typically, a video summarization is generated based on content included in the video data without regard to a length of the video summarization. Therefore, the video summarization may not be shared via certain social networks when the length exceeds the short duration of time.

To enable video summarization for length-restricted social networks, devices, systems and methods are disclosed that determine interesting snippets from video clips and generate a short video summarization (e.g., video microsummarization) with a microsummarization length determined based on the short period of time associated with a desired social network. For example, the system may determine a snippet length (e.g., length of time for individual video snippets) based on the number of video clips to include in the short period of time. The system may determine a priority metric (e.g., interesting score) for individual video frames in a video clip, generate a priority metric graph for the video clip and select a portion of the video clip (e.g., video data corresponding to the snippet length and including a peak of the priority metric graph) as a video snippet. The system may extract a video snippet for individual video clips and may determine an order for the video snippets. For example, the system may identify similar video snippets (e.g., video snippets sharing characteristics and/or theme(s)) and separate the similar video snippets with dissimilar video snippets. In some examples, the system may select the portion of the video clip based on similarities (or dissimilarities) between the video clip and other video snippets. The system may generate the microsummarization using the video snippets and may share the microsummarization to the social network and/or display the microsummarization to a user. Based on feedback from the user, the system may modify individual video snippets and generate a modified microsummarization.

FIG. 1 illustrates an overview of a system 100 for implementing embodiments of the disclosure. The system 100 includes a device 102 having a display 104, an image capture device 110 having camera(s) 115 and server(s) 112 all in communication with each other. While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the server(s) 112 may perform all of the steps illustrated in the drawings without communicating with the device 102 and/or the image capture device 110.

As illustrated in FIG. 1, the server(s) 112 may receive (120) video data. The server(s) 112 may receive the video data from a remote device (e.g., the device 102, the image capture device 110, a second server 112 or the like) or by accessing the video data on the server(s) 112. In some examples, the video data may be captured by the image capture device 110 and may be panoramic video data having a field of view beyond 180 degrees, which corresponds to video data with an aspect ratio greater than 2:1. However, the present disclosure is not limited thereto and the video data may have any field of view/aspect ratio and/or may be captured by other devices.

The server(s) 112 may receive (122) annotation data corresponding to the video data. For example, the annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s). The annotation data may have been generated by any of the device 102, the image capture device 110, the server(s) 112 and/or a remote device prior to the system receiving the video data in step 120, or the server(s) 112 may generate the annotation data as part of step 122.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the video clips may be determined prior to the server(s) 112 receiving the video data and the server(s) 112 may receive an indication of the video clips in the annotation data (e.g., annotation database, master clip table and/or video tag(s)).

In other examples, the server(s) 112 may extract individual video clips included in the video data based on priority metrics and the annotation data. For example, the server(s) 112 may determine a priority metric (e.g., interesting score indicating a measure of interest) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion.

The server(s) 112 may determine (124) a duration of time per video snippet. For example, the server(s) 112 may determine a length restriction associated with a desired social network (e.g., 6 seconds, 10 seconds, 15 seconds or the like) and a number of video snippets to be included in the video microsummarization and may determine the duration of time per video snippet. Thus, the server(s) 112 may determine a duration of 2 seconds per video snippet when a length restriction is 6 seconds and the video microsummarization is to include three video snippets. The server(s) 112 may determine the number of video snippets to be included in the video microsummarization based on input from the user 10, a number of video clips included in a video summarization, a number of discrete video clips included in the video data (e.g., video clips indicated by the master clip table), a number of discrete video segments included in the video data (e.g., discrete video segments captured at different times) or the like. In some examples, the server(s) 112 may determine the length restriction based on a social networking application, which is a software application running on the device 102 and/or server(s) 112 that is associated with the desired social network. For example, the server(s) 112 may receive a command to generate the video microsummarization from the social networking application and may output the video microsummarization to the social networking application to be shared on the social network.

The server(s) 112 may generate (126) priority metric graphs using the priority metric values associated with the video clips. For example, the server(s) 112 may generate a priority metric graph for a video clip using priority metric values associated with individual video frames included in the video clip. Thus, video clips are associated with individual priority metric graphs indicating priority metrics corresponding to individual video frames. In some examples, first priority metrics associated with a video summarization (e.g., no length restriction) may be different than second priority metrics associated with a video microsummarization (e.g., length restriction). For example, the server(s) 112 may use first weights when there is no length restriction and second weights when there is a length restriction, the second weights prioritizing certain characteristics (e.g., faces over landscapes, etc.) that are more interesting in a very short (e.g., 1-4 second) video snippet.

The server(s) 112 may determine (128) video snippets using the priority metric graphs. For example, the server(s) 112 may identify a peak (e.g., highest priority metric value) included in a priority metric graph and may select a portion of the video clip including the peak based on the duration of time per video snippet determined in step 124. As an example, when the duration of time per video snippet is determined to be 2 seconds, the server(s) 112 may select a 2 second portion of the video clip including the peak.

The server(s) 112 may determine (130) an order of the video snippets. For example, the server(s) 112 may order the video snippets chronologically, based on shared characteristics identified by the annotation data (e.g., similar video snippets positioned in series), based on different characteristics (e.g., similar video snippets separated by a different video snippet) or using other techniques known to one of skill in the art. In some examples, the server(s) 112 may receive input from the user 10 indicating the order of the video snippets and/or indicating preferences (e.g., selected themes, characteristics or the like) that the server(s) 112 may use to determine the order.

The server(s) 112 may generate (132) combined snippet data comprising the video snippets determined in step 128 positioned sequentially using the order determined in step 130. The combined snippet data (e.g., video microsummarization) may be output video data that is length restricted (e.g., 6 seconds, 10 seconds, 15 seconds or the like) based on the desired social network. The server(s) 112 may share (134) the combined snippet data to the desired social network. For example, the server(s) 112 may upload the combined snippet data to the desired social network, may transmit the combined snippet data to other users using the desired social network or the like.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video snippet may be a short section of a video clip (e.g., an extremely short section of the video data) including content determined to be "most interesting" or desirable for purposes of video microsummarization. For example, the server(s) 112 may generate a priority metric graph associated with a video clip, identify a peak (e.g., highest priority metric value) within the priority metric graph and generate a video snippet from the video clip including the peak and extending for a short (e.g., 1-4 second) duration of time.

As used herein, a video tag is a tag (i.e., data structure) including annotation information that may be used in video summarization/microsummarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. The theme may be associated with a structure, sequence, layouts, transitions, special effects and/or music that may be applied to video clips when creating output data (e.g., a video summarization or the like). As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The server(s) 112 may render the video (e.g., generate the video summarization and/or video microsummarization) using rendering information included in the generated video tags. For example, the rendering information may indicate an order of the selected video clips/snippets, the begin point and end point associated with the individual video clips/snippets, the selected theme, the selected panning for the individual video clip(s), the special effects, the audio data and/or other editing steps. As a first example, a first video tag may indicate the order of the selected video clips/snippets, a second video tag may indicate the begin point and the end point associated with a single video clip/snippet, etc. As a second example, a single video tag may include multiple edits, such as a first video tag indicating the begin point and the end point associated with a single video clip/snippet along with the selected panning for the single video clip/snippet and the special effects and/or audio data associated with the selected video clip/snippet. The video tags may correspond to individual video clip/snippet or a group of video clip/snippet without departing from the disclosure.

A moment may be associated with a region of interest within a video clip/snippet, which may include a time range (e.g., beginning frame and an ending frame) and a position (e.g., x and y pixel coordinates) within the video data. The server(s) 112 may generate video clips/video snippets based on the time range associated with the moment, but a video clip/snippet may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization and/or video microsummarization, such that the video summarization and/or video microsummarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

Video microsummarization may summarize lengthy video data (e.g., an hour of recording) or a video summarization (e.g., 2-5 minutes of video clips) in an extremely short video microsummary (e.g., 6-15 seconds) highlighting a portion of the interesting events that occurred in the video data and/or video summary. Therefore, each video snippet in the video microsummary may be extremely short relative to the video clips (e.g., between 1-4 seconds) and the portion of the video data included in the video snippet may be determined based on the video tags and/or annotation data (e.g., priority metrics), thus including in the video microsummarization the portions of video data (including the objects, angles, and times or the like) indicated by a user 10 and/or determined to be interesting (e.g., priority metric exceeding a threshold) by the server(s) 112.

As part of generating the video summarization, the device 102 may display output video data and may request input from a user 10 of the device 102. For example, the user 10 may instruct the device 102 to generate additional video data (e.g., create an additional video summarization and/or video microsummarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

While FIGS. 2A-2B illustrate cropping video data in space (e.g., determining cropped image 212 from panoramic image 210), the present disclosure is not limited thereto and the server(s) 112 may generate a video microsummarization using panoramic or non-panoramic video data without departing from the disclosure. In addition to cropping the video data in space, the server(s) 112 may modify video data by cropping in time. As illustrated in FIG. 2C, the server(s) 112 may select a portion of video data 230 and generate video clip data 232. For example, the video data 230 may be lengthy (e.g., 20+ minutes of recording, although the disclosure is not limited thereto) and the video clip data 232 may be relatively shorter (e.g., 5-60 seconds, although the disclosure is not limited thereto) highlighting an interesting event included in the video data. Additionally or alternatively, the server(s) 112 may select a portion of the video data 230 and/or the video clip data 232 and generate video snippet data 234. For example, the video snippet data 234 may be extremely short relative to the video data 230 and short relative to the video clip data 232, extending for 1-4 seconds and highlighting a portion of the interesting event. The server(s) 112 may determine the video clip data 232 and/or the video snippet data 234 using annotation data. For example, as described in greater detail below, the server(s) 112 may determine a priority metric associated with individual frames of the video data 230 and/or video clip data 232 and may select the video clip data 232 and/or the video snippet data 234 using priority metric values. The server(s) 112 may identify the video clip data 232 and the video snippet data 234 using a filtering mechanism to locate portions of the video data 230 without generating output video data. However, the present disclosure is not limited thereto and the server(s) 112 may generate output video data corresponding to the video clip data 232 and/or the video snippet data 234 without departing from the present disclosure.

FIG. 3 illustrates an example of types of annotation data according to embodiments of the present disclosure. As illustrated in FIG. 3, the server(s) 112 may analyze a video frame 310 and generate annotation data 312, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

In addition to the annotation data illustrated in FIG. 3, the server(s) 112 may generate additional annotation data. For example, the server(s) 112 may generate emotional data, which may include emotional detection (e.g., determining a mood such as happy, sad, excited, etc.) for an individual, a group of people, the video frame 310 or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

FIG. 4 is a flowchart conceptually illustrating an example method for generating annotation data according to embodiments of the present disclosure. As discussed above, the annotation data may be generated by the server(s) 112 or a remote device prior to generating the video summarization. For example, the server(s) 112 may generate annotation data upon receiving individual video clips, upon receiving video data or upon receiving a request for a video summarization. For ease of explanation, some of the steps illustrated in FIG. 4 are explicitly depicted as optional, indicated by dashed lines. However, any of the steps illustrated in FIG. 4 may be omitted without departing from the present disclosure. In addition, while the following description refers to the steps illustrated in FIG. 4 being executed by the server(s) 112, some or all of the steps illustrated in FIG. 4 may be executed by the device 102, the image capture device 110, the server(s) 112, a remote device or any combination thereof.

As illustrated in FIG. 4, the server(s) 112 may receive (410) video data and may optionally receive (412) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 410. While video data may include multiple video clips, the video data illustrated in FIG. 4 refers to video data associated with a single video clip (e.g., a video clip captured from a beginning time to an ending time). The server(s) 112 may determine (414) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (416) a current video frame and may identify (418) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (420) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (422) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (424) object(s), which may include determining a type of object, a brand of the object, a name for the object or the like. Thus, whereas step 422 identifies an existence of the object in the video frame, step 424 identifies an identity of the object or otherwise recognizes what the object is. The server(s) 112 may determine (426) famous landmarks (e.g., Big Ben, a famous cathedral, monument or the like) represented in the video frame based on the geographic location.

For example, the geographic location may be in proximity to a monument and the server(s) 112 may identify the monument within the video frame.

The server(s) 112 may determine (428) motion data, including motion data associated with the image capture device (e.g., movement of the image capture device while capturing the video data) and objects represented in the video data (e.g., movement of an object relative to the image capture device). The server(s) 112 may determine (430) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (432) a scene associated with the video frame. For example, the server(s) 112 may determine if the video frame was captured indoors or outdoors and may determine other characteristics that may be useful in determining a scene associated with the video frame. Finally, the server(s) 112 may update (434) the annotation data associated with the video frame and increment (436) video frame(s) (e.g., one video frame, several video frames or the like) and repeat steps 416-434. For example, the server(s) 112 may increment video frames linearly to update annotation data for video frames in the video data by one or at a fixed increment. Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 436 is performed and the amount to increment may vary without departing from the present disclosure.

In addition to using annotation data to generate video summarizations, the server(s) 112 may use the annotation data for additional functionality. As a first example, the server(s) 112 may extract information about a user 10 from the annotation data and may use the extracted information to target advertisements to the user 10. As a second example, the server(s) 112 may collect annotation data from a plurality of users and/or video clips to collate information. Thus, the server(s) 112 may create a database of annotation data and may use the database to identify trends, brands or the like from video data from a variety of sources.

FIGS. 5A-5H illustrate examples of annotation data according to embodiments of the present disclosure. As illustrated in FIG. 5A, the server(s) 112 may store annotation data in an annotation database 510. The annotation database 510 may include the annotation data discussed above (e.g., time, location, motion, faces, humans, scenes, audio, landmarks, objects, pets, directional data, etc.) for individual video frames. As illustrated in FIG. 5A, the annotation database 510 includes Frame 1, Frame 2, Frame 3, Frame 10, Frame 11, Frame 30 and Frame 35, although the annotation database 510 may include any number of video frames and is not limited to the example illustrated in FIG. 5A. In some examples, the annotation database 510 may include an entry for individual video frames included in video data (e.g., every video frame has an entry). In other examples, the annotation database 510 may include an entry every fixed number of video frames (e.g., 5th, 10th, 15th etc.). In some examples, the annotation database 510 may include an entry whenever the annotation data changes (e.g., annotation data is associated with intervening video frames until a following entry in the annotation database 510). Additionally or alternatively, the annotation database 510 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 510 illustrated in FIG. 5A may include video frames for multiple clips included in the video data. However, the disclosure is not limited thereto and FIG. 5B illustrates an annotation database 512 for an individual video clip. As illustrated in FIG. 5B, the annotation database 512 includes Frame 1, Frame 2, Frame 3, Frame 10, Frame 11, Frame 30 and Summary Data associated with the overall video clip. The annotation database 512 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 512 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 512 illustrated in FIG. 5B lists individual frames for the video clip, video frames may be grouped together as illustrated in the annotation database 514 illustrated in FIG. 5C. For example, the annotation database 514 groups Frames 1-200, Frames 350-600, Frames 800-1200, Frames 1500-1650 and Frames 2000-2200, Frames 2400-2550. The annotation database 514 may group the video frames based on annotation data and/or the frame selector statistic for the overall video clip.

FIG. 5D illustrates a Master Clip Table (MCT) 520 that includes Clips 1-7. The MCT 520 may indicate which frames are associated with a video clip (e.g., Clip 1 may be associated with Frames 1-450, which corresponds to a 15 second video clip at 30 Hz), a priority metric associated with the video clip, summary data (as discussed above with regard to FIG. 5B) associated with the video clip and/or a time/position of interesting moments within the video clip (e.g., pixel coordinates associated with individual timestamps corresponding to the moment).

In some examples, the user 10 may generate a video clip, which may be included in the MCT 520 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 520 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 520.

In some examples, the MCT 520 may include every video clip included in the video data (e.g., the video data is segmented into sequential video clips, each of which is included in the MCT 520), but the disclosure is not limited thereto and the MCT 520 may include only a portion of the video clips (e.g., interesting video clips associated with a portion of the video data). While the MCT 520 illustrated in FIG. 5D includes video clips associated with a single sequential stream of video data (e.g., video captured at one time), the disclosure is not limited thereto. Instead, a MCT 522 may include video clips associated with multiple streams of video data (e.g., video captured at more than one time, such as separate recordings) as illustrated in FIG. 5E. As illustrated in FIG. 5E, the MCT 522 includes Clips 1-4 captured at a first time (e.g., capture date of Sep. 15, 2015) and Clips 50-52 captured at a second time (e.g., capture data of Sep. 24, 2015). Additionally or alternatively, the MCT 522 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

FIG. 5F illustrates a detection results database 530. Instead of including individual rows for individual video frames or groups of video frames, the detection results database 530 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 530 indicates individual sections of the video data associated with the annotation data. Additionally or alternatively, the detection results database 530 may indicate multiple groups of video frames in a single column without departing from the disclosure.

Figure 5G:

FIG. 5G illustrates a face database 540 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 540. In some examples, a first unique face represented in first video clips may be associated with a second unique face represented in second video clips and the information may be combined in the face database 540. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 540 may be updated over time based on subsequent processing. While FIG. 5G illustrates the face database 540 indicating video clips associated with individual faces, the disclosure is not limited thereto and the face database 540 may indicate video frames associated with the individual faces without departing from the disclosure.

Figure 5H:
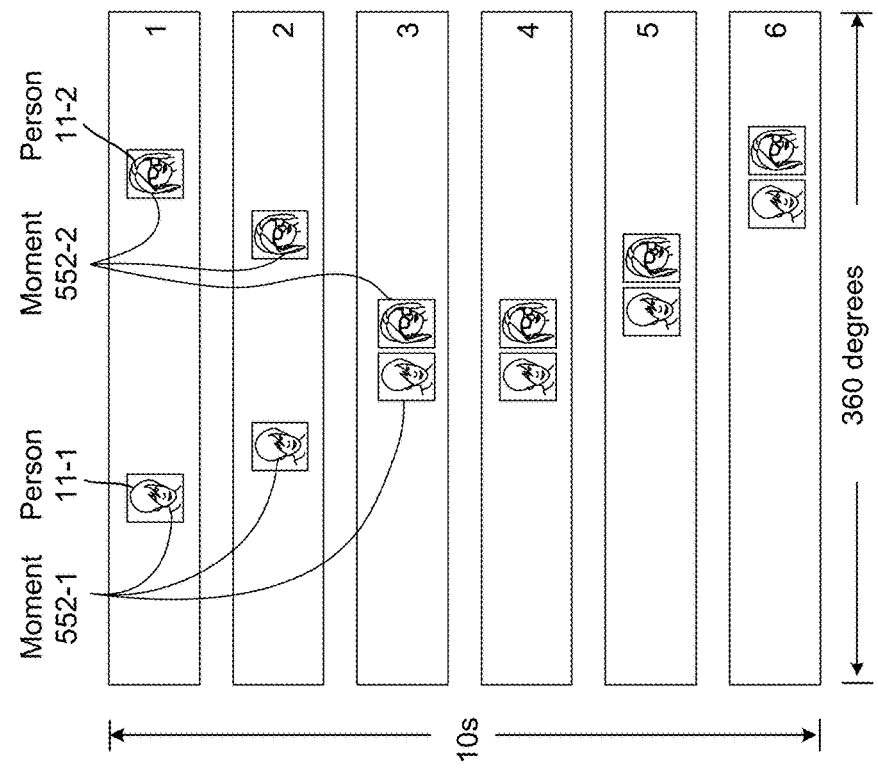

FIG. 5H illustrates an example of a video clip annotated with two moments, which are tracked over the course of the video clip. As illustrated in FIG. 5H, a video clip 530 may be 10 seconds long and may include a field of view of 360 degrees. In a first video frame (e.g., Frame 1), a first person 11-1 is at a first position and a second person 11-2 is at a second position. As the video clip progresses, the first person 11-1 travels in a first direction towards the second position and the second person 11-2 travels in a second direction towards the first position. The first person 11-1 and the second person 11-2 meet in a third video frame (e.g., Frame 3) and, remaining in proximity to each other, both move in the first direction (e.g., Frame 5 and Frame 6). The server(s) 112 may annotate the video clip 530 with two moments, a first moment 532-1 associated with the first person 11-1 (e.g., bounding box surrounding the first person 11-1) and a second moment 532-2 associated with the second person 11-2 (e.g., bounding box surrounding the second person 11-2). In some examples, the server(s) 112 may annotate the video clip 530 with a third moment indicating positions and/or video frames where the first person 11-1 and the second person 11-2 are in proximity. For example, the third moment may be a bounding box including the first person 11-1 and the second person 11-2 in Frames 3-6.

FIG. 6 illustrates an example of different weighting for determining priority metrics associated with video snippets and video clips according to embodiments of the present disclosure. As illustrated in FIG. 6, the server(s) 112 may use a weighting matrix 610 including first weights prioritizing certain characteristics in the annotation data when generating video clips having a variable length and second weights prioritizing other characteristics in the annotation data when generating video snippets having a short, fixed length. As an example, the second weights may prioritize certain characteristics (e.g., faces over landscapes, etc.) that are more interesting in a very short (e.g., 1-4 second) video snippet. Additionally or alternatively, the second weights may weight "action shots" (e.g., scenes with motion data exceeding a threshold) less than the first weights, as action shots require additional context. Similarly, the second weights may weight wide angle scenes with two distinct regions of interest less than the first weights, as the video snippets don't have enough time to pan between the two regions of interest.

FIG. 7 illustrates an example of generating combined clip data and combined snippet data according to embodiments of the present disclosure. As illustrated in FIG. 7, the server(s) 112 may receive video data 710 including a number of video clips and may extract video clip data 720 and/or video snippet data 722. While FIG. 7 illustrates the video snippet data 722 being extracted from the video clip data 720, this is intended to conceptually illustrate that the video snippet data 722 is a smaller portion of the video clip data 720 and the present disclosure is not limited thereto. Instead, the server(s) 112 may extract the video snippet data 722 directly from the video data 710 without departing from the present disclosure. Additionally or alternatively, while FIG. 7 illustrates the video data 710 comprising a single segment of video data including the video clip data 720, the video data 710 may instead include multiple segments of video data (e.g., discrete video segments captured at different times, each segment including one or more video clips) and/or multiple video clips. For example, the video data 710 may comprise the video clip data 720 as four discrete segments of video data without intervening video data. In some examples, the video clips may be determined prior to the server(s) 112 receiving the video data 710 and the server(s) 112 may receive an indication of the video clips in the annotation data (e.g., annotation database, master clip table and/or video tag(s)).

The server(s) 112 may receive annotation data corresponding to the video data 710, which may include an annotation database listing individual video frames and associated characteristics, a master clip table listing individual video clips and associated characteristics, video tag (s) indicating characteristics corresponding to specific video frame(s) and/or the like. The annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data.

In some examples, the server(s) 112 may extract the video clip data 720 from the video data 710 based on priority metrics and the annotation data. For example, the server(s) 112 may determine a priority metric (e.g., interesting score) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion. As illustrated in FIG. 7, the server(s) 112 may extract the video clip data 720 corresponding to video clip A, video clip B, video clip C and video clip D.

The server(s) 112 may extract the video snippet data 722 from the video clip data 720 and/or the video data 710. For example, the server(s) 112 may generate priority metric graphs using the priority metric values associated with the video clips. Thus, video clips are associated with individual priority metric graphs indicating priority metrics corresponding to individual video frames, and the server(s) 112 may extract video snippets using the priority metric graphs. For example, the server(s) 112 may identify a peak (e.g., highest priority metric value) included in a priority metric graph and may select a portion of the video clip including the peak. As an example, when a duration of time per video snippet is determined to be 2 seconds, the server(s) 112 may select a 2 second portion of the video clip including the peak. As illustrated in FIG. 7, the server(s) 112 may extract the video snippet data XX22 corresponding to video snippet a, video snippet b, video snippet c and video snippet d.

In some examples, first priority metrics associated with extracting the video clip data 720 may be different than second priority metrics associated with extracting the video snippet data 722. For example, the server(s) 112 may use first weights prioritizing certain characteristics in the annotation data when generating video clips having a variable length and use second weights prioritizing other characteristics in the annotation data when generating video snippets having a short, fixed length. As an example, the second weights may prioritize certain characteristics (e.g., faces over landscapes, etc.) that are more interesting in a very short (e.g., 1-4 second) video snippet.

The server(s) 112 may identify the video clip data 720 and the video snippet data 722 using a filtering mechanism to locate portions of the video data 710 without generating output video data. However, the present disclosure is not limited thereto and the server(s) 112 may generate output video data corresponding to the video clip data 720 and/or the video snippet data 722 without departing from the present disclosure. As illustrated in FIG. 7, the server(s) 112 may generate combined clip data 730 (e.g., video summarization) from the video clip data 720. The combined clip data 730 includes the portions of the video data 710 associated with the video clips without intervening video data. For example, the combined clip data 730 may summarize lengthy video data 710 (e.g., an hour of recording) in a short video summary (e.g., 2-5 minutes) highlighting the interesting events that occurred in the video data 710, with each video clip (e.g., video clips A-D) in the video summary being relatively short (e.g., between 5-60 seconds). While FIG. 7 illustrates the combined clip data 730 ordering the video clips chronologically, the present disclosure is not limited thereto and the order of the video clips may vary. For example, the server(s) 112 may determine common characteristics shared by two or more video clips (e.g., video clip A and video clip B) and may separate the two or more video clips with a video clip not sharing the common characteristics (e.g., insert video clip C between video clip A and video clip B).

Similarly, as illustrated in FIG. 7, the server(s) 112 may generate combined snippet data 732 (e.g., video microsummarization) from the video snippet data 722. The combined snippet data 732 includes the portions of the video data 710 associated with the video snippets without intervening video data. For example, the combined snippet data 732 may summarize lengthy video data 710 (e.g., an hour of recording) in an extremely short video microsummary (e.g., 6-15 seconds) highlighting a portion of the interesting events that occurred in the video data 710, with each video snippet (e.g., video snippets a-d) in the video microsummary being extremely short (e.g., between 1-4 seconds). While FIG. 7 illustrates the combined snippet data 732 ordering the video snippets chronologically, the present disclosure is not limited thereto and the order of the video snippets may vary. For example, the server(s) 112 may determine common characteristics shared by two or more video snippets (e.g., video snippets a and video snippets b) and may separate the two or more video snippets with a video snippet not sharing the common characteristics (e.g., insert video snippets c between video snippets a and video snippets b).

FIG. 8 illustrates examples of priority metric graphs according to embodiments of the present disclosure. As illustrated in FIG. 8, the video data 810 extends from a begin time (e.g., 0 seconds) to an end time (e.g., 30 seconds). The video data 810 may correspond to a video segment (e.g., video segment including multiple video clips) and/or a video clip. Using annotation data associated with the video data 810, the server(s) 112 may generate a first priority metric graph 820-1 and/or a second priority metric graph 820-2. For example, the server(s) 112 may retrieve existing priority metrics stored in the annotation data and/or may generate the priority metrics using the annotation data.

As illustrated in FIG. 8, a first priority metric graph 820-1 is illustrated as a bar graph including individual bars corresponding to individual priority metric values. A priority metric value may be associated with a single video frame or a series of video frames, in which case the bars included in the first priority metric graph 820-1 may be determined using quantization. For example, the server(s) 112 may segment the video frames and determine individual priority metric values corresponding to individual segments, reducing a computational load and/or smoothing the first priority metric graph 820-1. A second priority metric graph 820-2 is illustrated as a line chart based on the individual priority metric values, which may also be associated with a single video frame or a series of video frames. The second priority metric graph 820-2 may indicate raw priority metric values or may be a mathematical function (e.g., line of best fit) determined based on the raw priority metric values, for example to smooth the data. While FIG. 8 illustrates the priority metric graphs 820 using a bar chart and a line chart, the present disclosure is not limited thereto and the server(s) 112 may generate the priority metric graphs 820 using any techniques known to one of skill in the art without departing from the disclosure. Additionally or alternatively, the server(s) 112 may determine peaks from individual priority metric values associated with the video data 810 without generating a priority metric graph 820 without departing from the disclosure.

The priority metric graphs 820 indicate a priority metric value associated with individual video frames included in the video data 810. For example, the priority metric graphs 820 may include a priority metric value corresponding to each video frame included in the video data 810, an average of every n video frames (where n is a natural number), a sampling every n video frames, and/or a variable sampling (e.g., based on motion data, changes to the annotation data or the like), although the present disclosure may vary. As illustrated in priority metric graphs 820, the priority metric values vary over time, with relative peaks (e.g., the 2 second mark, the 6 second mark, the 12 second mark, the 18 second mark, the 22 second mark, 26 second mark and the 30 second mark) and intervening valleys.

The server(s) 112 may identify the relative peaks using mathematical techniques known to one of skill in the art. In some examples, the server(s) 112 may determine a threshold to identify relative peaks that are interesting (e.g., highest peaks, above average peaks or the like). For example, the server(s) 112 may calculate a threshold (e.g., a horizontal line associated with a fixed priority metric value) and determine relative peaks exceeding the threshold. The server(s) 112 may calculate the threshold as a global threshold (e.g., universal threshold for multiple video segments/video clips included in the video data), a local threshold (e.g., individual threshold associated with a single video segment/video clip) or a variable threshold (e.g., variable threshold based on the average priority metric value within a range (e.g., time window). For example, the server(s) 112 may determine a fixed threshold (not shown) for the video data 810 and may determine the relative peaks exceeding the fixed threshold (e.g., the 6 second mark, the 12 second mark, 26 second mark and the 30 second mark). Thus, the server(s) 112 may identify four moments of interest in the video data 810 and may generate one or more video snippets from the moments of interest.

In some examples, the priority metric graphs 820 may not be as smooth as the examples illustrated in FIG. 8 and the server(s) 112 may need to identify spikes in the priority metric graphs 820. A spike in the priority metric graph 820 may indicate a series of video frames that are interesting relative to neighboring video frames, corresponding to a brief moment of interest that may be extracted as a video snippet. For example, in some examples a peak in the priority metric graph 820 may correspond to an interesting moment but may extend for a relatively long period of time (e.g., 4+ seconds), which may be difficult to extract as a video snippet (e.g., the interesting aspect of the peak extends over time and truncating the peak to generate a video snippet removes proper context). In contrast, a short peak (e.g., spike) may extend for a relatively short period of time (e.g., 1-2 seconds) and may retain context as a video snippet. To identify spikes in the priority metric graph 820, the server(s) 112 may use a variable threshold. Thus, instead of using a fixed threshold associated with the video data 810 from 0 seconds to 30 seconds, the server(s) 112 may divide the video data 810 into multiple sections and determine individual thresholds associated with each section. For example, the server(s) 112 may divide the video data 810 into fixed sections based on time (e.g., from 0 seconds to 10 seconds, 10 seconds to 20 seconds, etc.), multiple variable sections based on peaks (e.g., from first peak to second peak, from second peak to third peak, etc.), multiple variable sections including portions of the valleys (e.g., beginning of first valley to end of first valley, beginning of second valley to end of second valley, etc.) or the like. Additionally or alternatively, the server(s) 112 may determine the threshold using a running average (e.g., average priority metric values over 5 seconds) or the like to determine where the priority metric graph 820 spikes relative to surrounding video frames.

FIGS. 9A-9B illustrate examples of selecting a peak in a priority metric graph according to embodiments of the present disclosure. As discussed above with regard to FIG.

8, the server(s) 112 may identify moments of interest in the video data 810 using the priority metric graph 820 and may generate one or more video snippets from the moments of interest.

As illustrated in FIG. 9A, the server(s) 112 may determine video clip data 920 (e.g., clip A) from the video data 810 using the first priority metric graph 820-1. For example, the server(s) 112 may identify a portion of the first priority metric graph 820-1 (e.g., from 4 seconds to 14 seconds) as being interesting and may generate the video clip data 920 using a corresponding portion of the video data 810. The server(s) 112 may identify the portion based on an average priority metric value exceeding a threshold or the like. For example, if the threshold was lower, the portion may include the first relative peak and extend from 0 seconds to 14 seconds.

Similarly, the server(s) 112 may determine video snippet data 922 (e.g., clip a) from the video data 810 using the first priority metric graph 820-1. For example, the server(s) 112 may identify a highest peak (e.g., highest priority metric value) included in the first priority metric graph 820-1 and may select a portion of the video data 810 (or the video clip data 920) including the peak. The server(s) 112 may determine a duration of time (e.g., time window) per video snippet based on a desired length of the output video and a number of video clips to include. For example, when the time window is determined to be 2 seconds, the server(s) 112 may select a 2 second portion of the video data 810 (or the video clip data 920) extending from 10 seconds to 12 seconds. However, a length of the time window may vary and the server(s) 112 may determine the video snippet data 922 to be longer or shorter than illustrated in FIG. 9A without departing from the present disclosure.

While FIG. 9A illustrates the video clip data 920 and the video snippet data 922 being generated based on the first priority metric graph 820-1, the present disclosure is not limited thereto. As discussed above, in some examples the server(s) 112 may determine first priority metrics using first weights for the video clip data 920 and may determine second priority metrics using second weights for the video snippet data 922. For example, the first weights may prioritize characteristics of the video data 810 that may correspond to an interesting video clip over a relatively long duration of time, whereas the second weights may prioritize characteristics that may correspond to an interesting video snippet over a relatively short period of time.

As illustrated in FIG. 9B, the server(s) 112 may determine multiple video snippets using the fixed time window and may select one of the video snippets. For example, the server(s) 112 may identify first video snippet data 922-1 (e.g., clip a1) extending from 10 seconds to 12 seconds, second video snippet data 922-2 (e.g., clip a2) extending from 11 seconds to 13 seconds and third video snippet data 922-3 (e.g., clip a3) extending from 12 seconds to 14 seconds. Each of the video snippet data 922 may include portions of the peak, but varying (e.g., shifting) the time window may provide additional context for the video snippet.

In some examples, the server(s) 112 may display the first video snippet data 922-1 to the user 10 and may receive input from the user 10 to shift the time window to select the third video snippet data 922-3. For example, the server(s) 112 may display combined snippet data (e.g., video microsummarization) to the user 10 and receive input from the user 10 requesting to modify the combined snippet data. The server(s) 112 may display individual video snippets, such as the first video snippet data 922-1, and the user 10 may provide input using a user interface to shift the time window to select the third video snippet data 922-3. The server(s) 112 may then generate modified combined snippet data including the third video snippet data 922-3.

In some examples, the server(s) 112 may select multiple time windows associated with a peak and may alternate the time windows in the video microsummarization. For example, the server(s) 112 may select the first video snippet data 922-1 (e.g., clip a1), the second video snippet data 922-2 (e.g., clip a2) and the third video snippet data 922-3 (e.g., clip a3) to include in the combined snippet data (e.g., the video microsummarization may include clip a1, clip b, clip a2, clip c and clip a3). Additionally or alternatively, the server(s) 112 may select multiple time windows associated with two or more peaks and may alternate the time windows using an offset. For example, the server(s) 112 may identify a second peak (e.g., from around 24 seconds to 28 seconds) and may identify a first clip b1 extending from 24 seconds to 26 seconds, a second clip b2 extending from 25 seconds to 27 seconds and third clip b3 extending from 26 seconds to 28 seconds. Thus, the server(s) 112 may include each of the clips associated with the first peak (e.g., clips a1-a3) and the second peak (e.g., clips b1-b3) in the combined snippet data (e.g., the video microsummarization may include clip a1, clip b1, clip a2, clip b2, clip a3 and clip b3).

FIG. 10 illustrates an example of video clip data and video snippet data according to embodiments of the present disclosure. As illustrated in FIG. 10, video data 1010 may represent a baby crawling and trying to stand. For example, a first video frame 1012-1 may represent the baby crawling to an ottoman, a second video frame 1012-2 may represent the baby pushing himself upright, a third video frame 1012-3 may represent the baby standing upright unsupported and a fourth video frame 1012-4 may represent the baby falling backwards to a seated position. As illustrated in FIG. 10, the server(s) 112 may generate video clip data 1020 including a first portion of the video data 1010 corresponding to the entire sequence of events (e.g., extending from first video frame 1012-1 to fourth video frame 1012-4). Thus, the first portion may have a relatively long duration (e.g., 5-20 seconds) but include multiple interesting moments associated with the baby trying to stand. In contrast, the server(s) 112 may generate video snippet data 1022 including a second portion of the video data 1010 corresponding to a single event (e.g., extending from just before the third video frame 1012-3 to just after the third video frame 1012-3). Thus, the second portion may have a relatively short duration (e.g., 2 seconds) and only include a single interesting moment (e.g., the baby standing).

FIG. 11 illustrates an example of video clip data and video snippet data according to embodiments of the present disclosure. As illustrated in FIG. 11, video data 1110 may represent a child blowing out birthday candles. For example, a first video frame 1112-1 may represent the child seated at a table with gifts, a second video frame 1112-2 may represent a parent carrying a birthday cake full of lit candles to the child, a third video frame 1112-3 may represent the child blowing out the candles and a fourth video frame 1112-4 may represent the birthday cake with the blown out candles. As illustrated in FIG. 11, the server(s) 112 may generate video clip data 1120 including a first portion of the video data 1110 corresponding to the entire sequence of events (e.g., extending from first video frame 1112-1 to fourth video frame 1112-4). Thus, the first portion may have a relatively long duration (e.g., 5-40 seconds, depending on how long Happy Birthday is sung) but include multiple interesting moments associated with the child blowing out the birthday cake. In contrast, the server(s) 112 may generate video snippet data 1122 including a second portion of the video data 1110 corresponding to a single event (e.g., extending from just before the third video frame 1112-3 to just after the third video frame 1112-3). Thus, the second portion may have a relatively short duration (e.g., 2 seconds) and only include a single interesting moment (e.g., the child blowing out the birthday cake).

Figure 12:
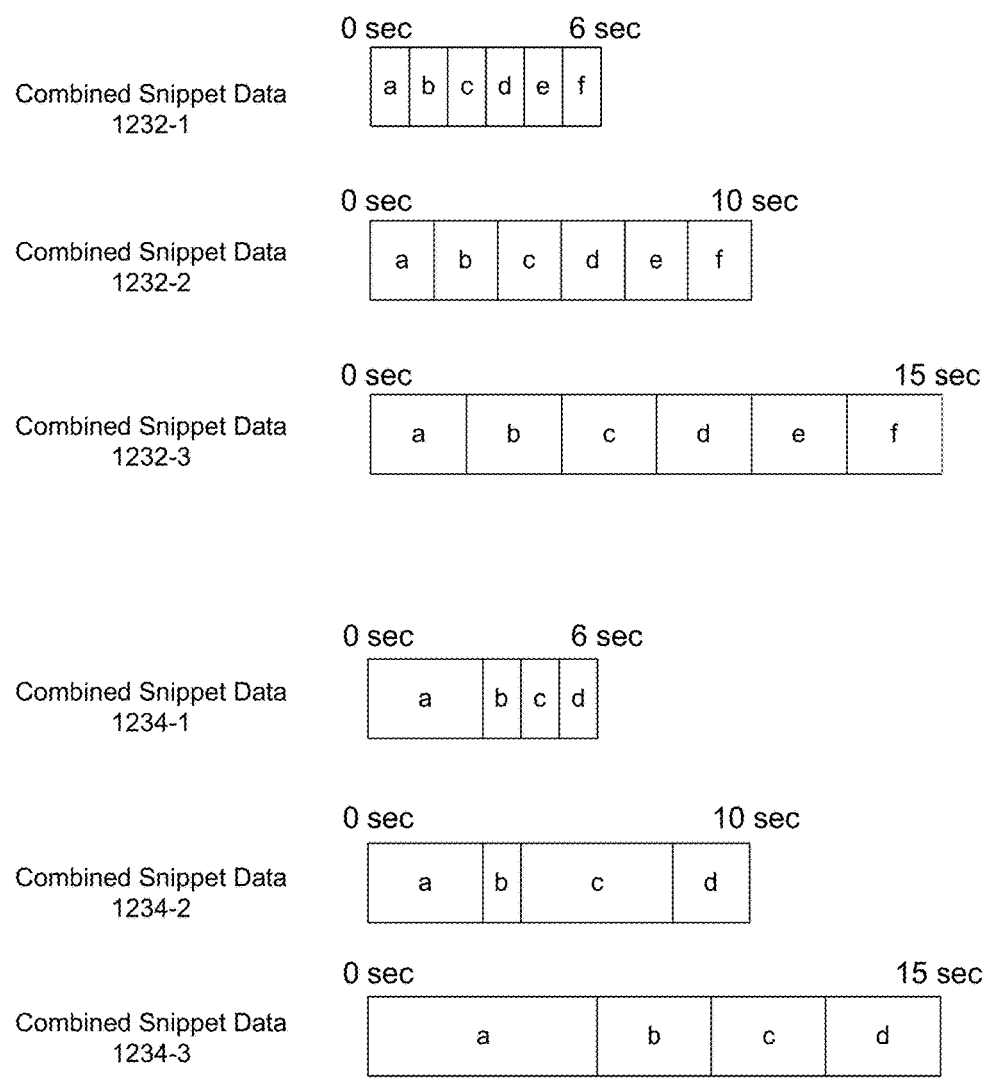
FIG. 12 illustrates examples of combined snippet data according to embodiments of the present disclosure.

FIG. 12 illustrates examples of combined snippet data according to embodiments of the present disclosure. As illustrated in FIG. 12, first combined snippet data 1232-1 may include six video snippets (e.g., video snippets a-f) extending for a length of 6 seconds (e.g., time window of 1 second each), second combined snippet data 1232-2 may include six video snippets (e.g., video snippets a-f) extending for a length of 10 seconds (e.g., time window of just under 2 seconds each) and third combined snippet data 1232-3 may include six video snippets (e.g., video snippets a-f) extending for a length of 15 seconds (e.g., time window of just under 3 seconds each). Thus, the combined snippet data 1232 may have a uniform time window (e.g., same length associated with each video snippet), with the time window determined by a total length of the combined snippet data 1232 and the number of video snippets.

In contrast, combined snippet data 1234 may have a variable time window (e.g., each video snippet may have a different length), with an individual time window determined based on a corresponding priority metric graph, a total length of the combined snippet data 1234 and the number of video snippets. For example, first combined snippet data 1234-1 may include four video snippets (e.g., video snippets a-d) extending for a length of 6 seconds, with a first time window associated with video snippet a relatively long compared to a second time window associated with video snippets b-d. As an example, the server(s) 112 may determine that video snippet a has higher priority metric values and/or longer peak than video snippets b-d.

Second combined snippet data 1234-2 may include four video snippets (e.g., video snippets a-d) extending for a length of 10 seconds, with individual time windows associated with the individual video snippets. Thus, the server(s) 112 may include more video data associated with video snippets a and c relative to video snippets b and d, although the individual time windows are longer than corresponding snippets a-d included in the first combined snippet data 1234-1.

Third combined snippet data 1234-3 may include four video snippets (e.g., video snippets a-d) extending for a length of 15 seconds, with a first time window associated with video snippet a relatively long compared to a second time window associated with video snippets b-d. Thus, the server(s) 112 may determine that video snippet a has higher priority metric values and/or longer peak than video snippets b-d, although the second time windows are longer than corresponding time windows included in the second combined snippet data 1234-2.

While FIG. 12 illustrates the video snippets positioned in a sequential order (e.g., a-f), this is intended for illustrative purposes only and the present disclosure is not limited thereto. Thus, while some examples may order video snippets sequentially, the video snippets may be ordered randomly or non-sequentially without departing from the disclosure. For example, the server(s) 112 may determine similarities and differences between video snippets using annotation data and may determine an order of the video snippets based on the similarities and differences, as discussed in greater detail below.

FIG. 13A-13C illustrate examples of ordering video snippets according to embodiments of the present disclosure. As illustrated in FIGS. 13A-13C, the server(s) 112 may receive video clip data 1310/1320/1330 (e.g., video clips A-D), may generate video snippet data 1312/1322/1332 (e.g., video snippets a-d) from the video clip data 1310/1320/1330 and may generate combined snippet data 1314/1324/1334 including the video snippet data 1312. However, the server(s) 112 may generate the video snippet data 1312/1322/1332 and determine an order of the combined snippet data 1314/1324/1334 using different techniques. For example, FIG. 13A illustrates generating the video snippet data 1312 having similar characteristics, FIG. 13B illustrates generating the video snippet data 1322 having different characteristics and FIG. 13C illustrates ordering the combined video snippet data 1334 to separate similar characteristics.

For ease of explanation, FIGS. 13A-13C illustrate the video clip data 1310/1320/1330 having up to three distinct characteristics. However, the present disclosure is not limited thereto and the video data may have more than three characteristics and/or portions of the video data may be associated with multiple characteristics. Additionally or alternatively, the video data may have a variety of characteristics and the server(s) 112 may determine similarities and differences based on the multiple characteristics instead of individual characteristics. For example, the server(s) 112 may use the annotation data to identify multiple characteristics in common between each of the video clip data 1310/1320/1330.

As illustrated in FIG. 13A, the server(s) 112 may identify characteristics (e.g., Characteristic 1 and Characteristic 2) associated with video clip data 1310 and may select video snippet data 1312 to include similar characteristics. For example, the server(s) 112 may associate portions of the video clip data 1310 with Characteristic 1 (e.g., first portions of video clips A and D and second portions of video clips B and C that include mostly environment/objects/textural shots) or Characteristic 2 (e.g., first portions of video clips B and C and second portions of video clips A and D that include mostly people). In the example illustrated in FIG. 13A, the server(s) 112 may select the video snippet data 1312 to be similar (e.g., associated with the same characteristic), for example to generate the combined snippet data 1314 with a common characteristic between the video snippets (e.g., emphasizing people). Thus, the server(s) 112 may select portions of the video clip data 1310 associated with the same characteristic (e.g., Characteristic 2). For example, the server(s) 112 may select video snippets a-d from the portions of video clips A-D associated with Characteristic 2. Therefore, combined snippet data 1314 may include a common characteristic for included video snippets.

As illustrated in FIG. 13B, the server(s) 112 may identify characteristics (e.g., Characteristic 1 and Characteristic 2) associated with video clip data 1320 and may select video snippet data 1322 to include a mixture of characteristics. For example, the server(s) 112 may associate portions of the video clip data 1320 with Characteristic 1 (e.g., first portions of video clips A and D and second portions of video clips B and C that include mostly environment/objects/textural shots) or Characteristic 2 (e.g., first portions of video clips B and C and second portions of video clips A and D that include mostly people). In the example illustrated in FIG. 13B, the server(s) 112 may select the video snippet data 1322 to be different (e.g., having a variety of characteristics), for example to generate the combined snippet data 1324 with visible differences between the video snippets. Thus, the server(s) 112 may select portions of the video clip data 1320 having different characteristics to avoid identical characteristics between neighboring video snippets. For example, the server(s) 112 may select video snippets a and c from the portions of video clips A and C associated with Characteristic 2 and video snippets b and d from the portions of video clips B and D associated with Characteristic 1. Therefore, combined snippet data 1324 may alternate between Characteristic 1 and Characteristic 2 (e.g., alternating snippets emphasizing people with snippets emphasizing environment/objects/textural shots).

As illustrated in FIG. 13C, the server(s) 112 may identify characteristics (e.g., Characteristic 1, Characteristic 2 and Characteristic 3) associated with video clip data 1330, may select video snippet data 1332 without regard to the characteristics (e.g., selecting the most interesting portions of the video clip data 1330 based on a priority metric) and may order the video snippets within the combined snippet data 1334 to alternate characteristics. For example, the server(s) 112 may associate portions of the video clip data 1320 with Characteristic 1 (e.g., first portions of video clips A and D and a second portion of video clip B that include mostly environment/textural shots), Characteristic 2 (e.g., first portions of video clips B and C and second portions of video clips A and D that include mostly people) or Characteristic 3 (e.g., second portion of video clip C that includes mostly objects). In the example illustrated in FIG. 13C, the server(s) 112 may select the video snippet data 1332 without regard to the associated characteristics but may reorder the video snippets based on the characteristics. For example, the server(s) 112 may select video snippets a and b associated with Characteristic 1, video snippet c associated with Characteristic 3 and video snippet d associated with Characteristic 2. To separate video snippets a and b (which are both associated with Characteristic 1), the server(s) 112 may reorder the video snippets to insert video snippets c and d between video snippets a and b. Alternatively, the server(s) 112 may insert either of video snippets c or d between video snippets a and b without departing from the disclosure. Therefore, combined snippet data 1334 may alternate between characteristics (e.g., Characteristic 1, Characteristic 3, Characteristic 2, Characteristic 1) to include visible differences between the video snippets.

Figure 14:
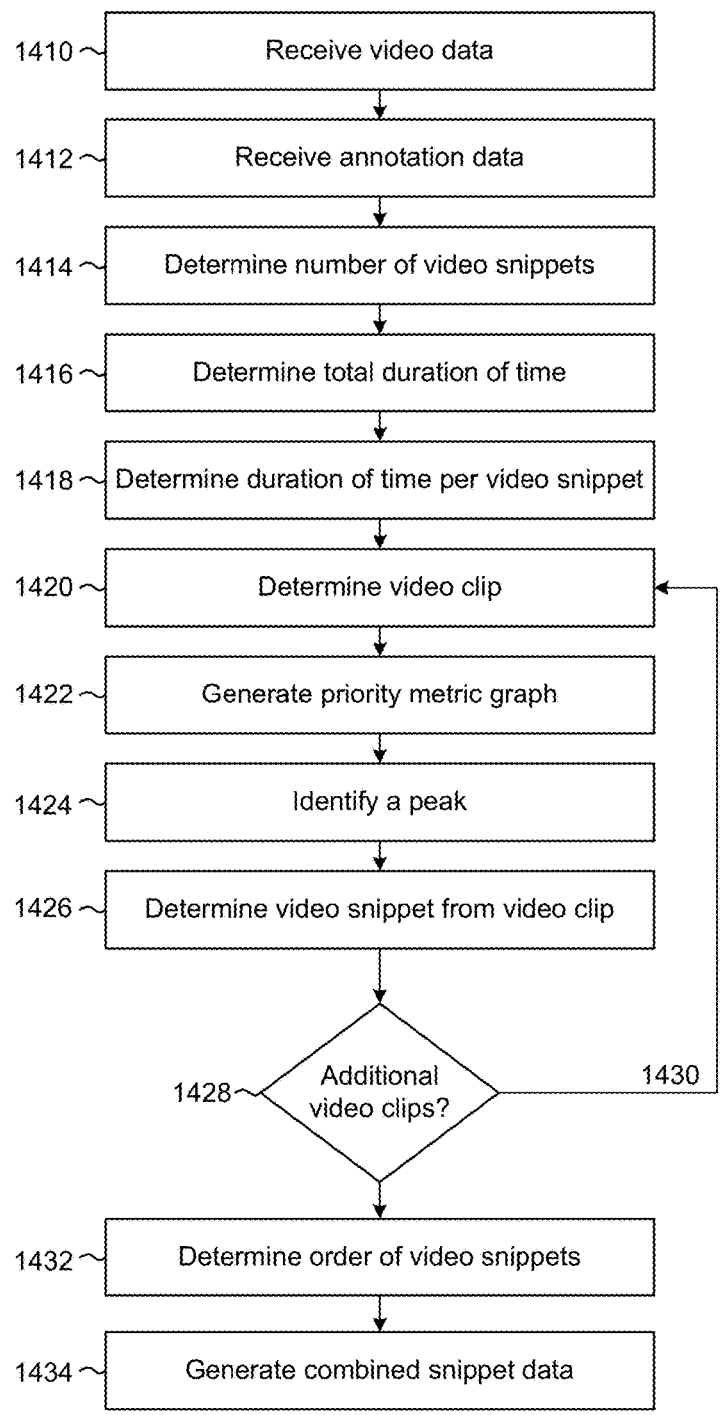
FIG. 14 is a flowchart conceptually illustrating an example method for generating output video data according to embodiments of the present disclosure.

FIG. 14 is a flowchart conceptually illustrating an example method for generating output video data according to embodiments of the present disclosure. As illustrated in FIG. 14, the server(s) 112 may receive (1410) video data. The server(s) 112 may receive the video data from a remote device (e.g., the device 102, the image capture device 110, a second server 112 or the like) or by accessing the video data on the server(s) 112. In some examples, the video data may be captured by the image capture device 110 and may be panoramic video data having a field of view beyond 180 degrees, which corresponds to video data with an aspect ratio greater than 2:1. However, the present disclosure is not limited thereto and the video data may have any field of view/aspect ratio and/or may be captured by other devices.

The server(s) 112 may receive (1412) annotation data corresponding to the video data. For example, the annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s). The annotation data may have been generated by any of the device 102, the image capture device 110, the server(s) 112 and/or a remote device prior to the system receiving the video data in step 120, or the server(s) 112 may generate the annotation data as part of step 1412.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the video clips may be determined prior to the server(s) 112 receiving the video data and the server(s) 112 may receive an indication of the video clips in the annotation data (e.g., annotation database, master clip table and/or video tag(s)).

The server(s) 112 may determine (1414) a number of video snippets to include in a video microsummarization. For example, the server(s) 112 may determine the number of video snippets to be included in the video microsummarization based on input from the user 10, a number of video clips included in a video summarization, a number of discrete video clips included in the video data (e.g., video clips indicated by the master clip table), a number of discrete video segments included in the video data (e.g., discrete video segments captured at different times) or the like. In some examples, the server(s) 112 may determine the number of video clips listed in the master clip table and may generate an individual video snippet for each of the video clips. In other examples, the server(s) 112 may receive input from the user 10 identifying the number of video snippets and/or selecting individual video clips to include in the video microsummarization. In some examples, the server(s) 112 may identify and/or extract the individual video clips from the video data using the annotation data, as described in greater detail above. While an individual video clip may correspond to a single video snippet, the disclosure is not limited thereto. Instead, a video clip may include multiple video snippets and therefore the server(s) 112 may determine the number of video snippets based on priority metrics associated with the video data.

The server(s) 112 may determine (1416) a total duration of time associated with the video microsummarization. For example, the server(s) 112 may determine a desired social network with which to share the video microsummarization and may determine a length-restriction associated with the social network (e.g., 6 seconds, 10 seconds, 15 seconds or the like). The server(s) 112 may determine (1418) a duration of time (e.g., time window) per video snippet using the total duration of time and the number of video snippets to include in the video microsummarization. For example, the server(s) 112 may assume a uniform time window and may determine the time window by dividing the total duration of time by the number of video snippets (e.g., 6 second total duration of time divided by 3 video snippets results in a 2 second time window per snippet). However, the disclosure is not limited thereto and the server(s) 112 may determine an estimated time window and may modify individual time windows based on the priority metrics associated with individual video snippets. For example, a first priority metric graph may have a peak extending 3 seconds and a second priority graph may have a peak extending 1 second. Instead of truncating a first video snippet from 3 seconds to 2 seconds and extending a second video snippet from 1 second to 2 seconds (e.g., using a uniform time window), the server(s) 112 may generate the first video snippet with a length of 3 seconds and the second video snippet with a length of 1 second. Additional examples of time windows are described above with regard to FIG. 12.

The server(s) 112 may determine (1420) a video clip to process. For example, the server(s) 112 may determine a video clip from discrete video clip data, from discrete video segments, from the video data using the master clip table or the like. The server(s) 112 may generate (1422) a priority metric graph associated with the video clip, as described in greater detail above with regard to FIG. 8. The server(s) 112 may identify (1424) a peak (e.g., highest priority metric value) within the priority metric graph, as described in greater detail above with regard to FIGS. 9A-9B. In some examples, the server(s) 112 may identify multiple peaks (e.g., two or more peaks having similar values) and may select one or more of the peaks based on annotation data, other video snippets, identified themes/characteristics input to the server(s) 112 or the like. The server(s) 112 may determine (1426) a video snippet from the video clip corresponding to the identified peak.

The server(s) 112 may determine (1428) if there are additional video clips to include in the video microsummarization. If there are additional video clip(s), the server(s) 112 may loop (1430) to step 1420 and repeat steps 1420-1428 for the additional video clip(s). If not, the server(s) 112 may determine (1432) an order of the video snippets, as described in greater detail above with regard to FIGS. 13A-13C. For example, the server(s) 112 may order the video snippets chronologically, based on shared characteristics identified by the annotation data (e.g., similar video snippets positioned in series), based on different characteristics (e.g., similar video snippets separated by a different video snippet) or using other techniques known to one of skill in the art. In some examples, the server(s) 112 may receive input from the user 10 indicating the order of the video snippets and/or indicating preferences (e.g., selected themes, characteristics or the like) that the server(s) 112 may use to determine the order.

The server(s) 112 may generate (1434) combined snippet data (e.g., video microsummarization) using the determined video snippets and the determined order. The combined snippet data (e.g., video microsummarization) may be output video data that is length restricted (e.g., 6 seconds, 10 seconds, 15 seconds or the like) based on the desired social network. The server(s) 112 may optionally share the combined snippet data to a desired social network, transmit the combined snippet data to the device 102 or the like.

Figure 15:
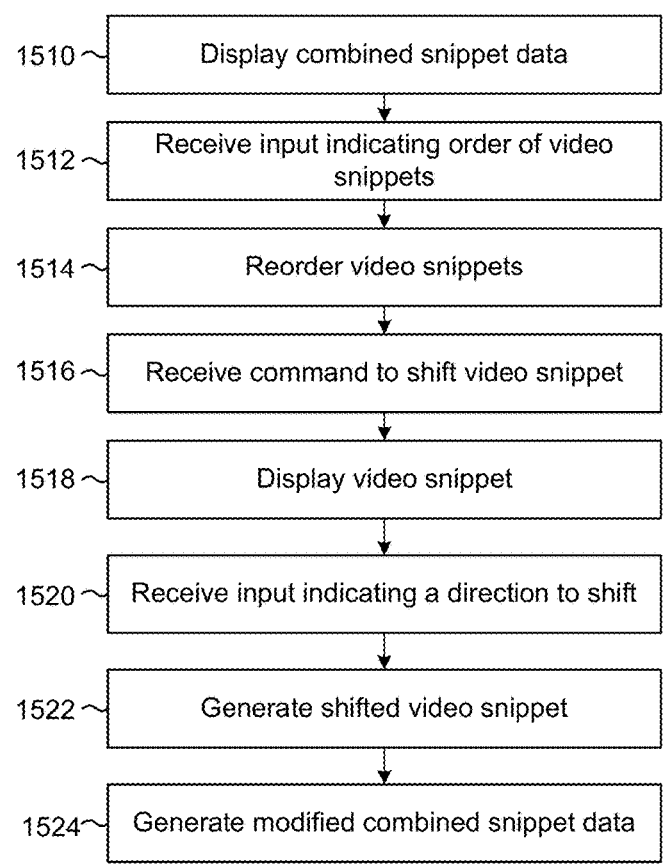
FIG. 15 is a flowchart conceptually illustrating an example method for modifying output video data based on inputs according to embodiments of the present disclosure.

In some examples, the server(s) 112 may display the combined snippet data to the user 10 (e.g., via the device 102 or the like) and receive feedback modifying parameters of the video snippets included in the combined snippet data. The server(s) 112 may generate modified combined snippet data based on the feedback. FIG. 15 is a flowchart conceptually illustrating an example method for modifying output video data based on inputs according to embodiments of the present disclosure.

As illustrated in FIG. 15, the server(s) 112 may display (1510) the combined snippet data to the user 10. For example, the server(s) 112 may transmit the combined snippet data to the device 102 and the device 102 may display the combined snippet data using the display 104. The server(s) 112 may receive (1512) input indicating an order of the video snippets included in the combined snippet data. For example, the device 102 may display a user interface to the user 10 and receive input from the user 10 selecting an order for the video snippets. The server(s) 112 may reorder (1514) the video snippets based on the input.

The server(s) 112 may receive (1516) a command to shift a video snippet, may display (1518) the video snippet to be shifted, may receive (1520) an input indicating a direction to shift the video snippet and may generate (1522) a shifted video snippet. Shifting the video snippet comprises moving a time window associated with the video snippet without increasing or decreasing the time window. For example, the user 10 may identify a particular video snippet to modify and the device 102 may display the video snippet on the display 104. The user 10 may indicate that the video snippet should be shifted by 1 second and the server(s) 112 may move the time window associated with the video snippet from a first time to a second time in a corresponding video clip (e.g., instead of the video snippet starting at 10 seconds and ending at 12 seconds, the video snippet starts at 12 seconds and ends at 14 seconds).

The server(s) 112 may generate modified combined snippet data using the modified order and including the shifted video snippet. Thus, the server(s) 112 may enable the user 10 to customize and/or modify the combined snippet data to generate the modified combined snippet data prior to sharing on the desired social network.

Figure 16:
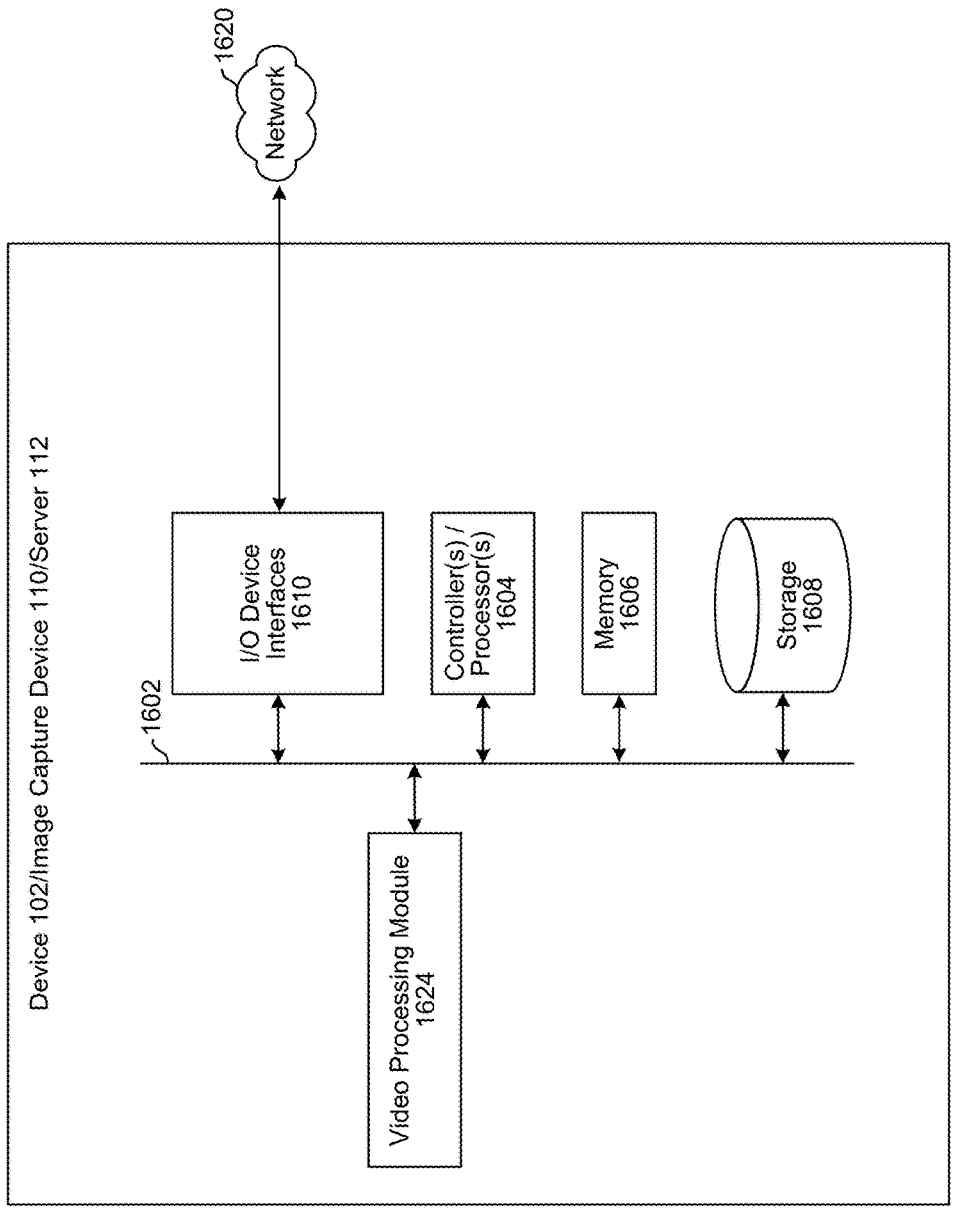
FIG. 16 is a block diagram conceptually illustrating example components of a system according to embodiments of the present disclosure.

FIG. 16 illustrates a block diagram conceptually illustrating example components of a system 100 including one or more of a device 102, an image capture device 110 and/or a server(s) 112. Depending upon how the system is structured, some of the components illustrated in FIG. 16 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1608 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 16, the device 102/image capture device 110/server(s) 112 may include an address/data bus 1602 for conveying data among components of the device 102/image capture device 110/server(s) 112. Each component within the device 102/image capture device 110/server(s) 112 may also be directly connected to other components in addition to (or instead of) being connected to other components across the bus 1602.

The device 102/image capture device 110/server(s) 112 may include one or more controllers/processors 1604 comprising one-or-more central processing units (CPUs) for processing data and computer-readable instructions and a memory 1606 for storing data and instructions. The memory 1606 may include volatile random access memory (RAM), non-volatile read only memory (ROM), non-volatile magnetoresistive (MRAM) and/or other types of memory. The device 102/image capture device 110/server(s) 112 may also include a data storage component 1608 for storing data and processor-executable instructions. The data storage component 1608 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1610.

The device 102/image capture device 110/server(s) 112 includes input/output device interfaces 1610. A variety of components may be connected to the device 102/image capture device 110/server(s) 112 through the input/output device interfaces 1610, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure.

The input/output device interfaces 1610 may be configured to operate with a network 1620, for example a wireless local area network (WLAN) (such as WiFi), Bluetooth®, ZigBee® and/or wireless networks, such as a Long Term Evolution (LTE) network, WiMAX™ network, 3G network, etc. The network 1620 may include a local or private network or may include a wide network such as the internet. Devices may be connected to the network 1620 through either wired or wireless connections.

The input/output device interfaces 1610 may also include an interface for an external peripheral device connection such as universal serial bus (USB), FireWire, Thunderbolt, Ethernet port or other connection protocol that may connect to networks 1620. The input/output device interfaces 1610 may also include a connection to an antenna (not shown) to connect one or more networks 1620 via a wireless local area network (WLAN) (such as WiFi) radio, Bluetooth®, and/or wireless network radio, such as a radio capable of communication with a wireless communication network such as a Long Term Evolution (LTE) network, WiMAX™ network, 3G network, etc.

The device 102/image capture device 110/server(s) 112 further includes a video processing module 1624, which may comprise processor-executable instructions stored in storage 1608 to be executed by controller(s)/processor(s) 1604 (e.g., software, firmware), hardware, or some combination thereof. For example, components of the video processing module 1624 may be part of a software application running in the foreground and/or background on the device 102/image capture device 110/server(s) 112. The video processing module 1624 may control the device 102/image capture device 110/server(s) 112 as discussed above, for example with regard to FIGS. 1, 14 and/or 15. Some or all of the controllers/modules of the video processing module 1624 may be executable instructions that may be embedded in hardware or firmware in addition to, or instead of, software. In one embodiment, the device 102/image capture device 110/server(s) 112 may operate using an Android® operating system (such as Android® 4.3 Jelly Bean, Android® 4.4 KitKat or the like), an Amazon® operating system (such as FireOS or the like), or any other suitable operating system.

Executable computer instructions for operating the device 102/image capture device 110/server(s) 112 and its various components may be executed by the controller(s)/processor(s) 1604, using the memory 1606 as temporary "working" storage at runtime. The executable instructions may be stored in a non-transitory manner in non-volatile memory 1606, storage 1608, or an external device. Alternatively, some or all of the executable instructions may be embedded in hardware or firmware in addition to or instead of software.

The components of the device(s) 102/image capture device 110/server(s) 112, as illustrated in FIG. 16, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 17:
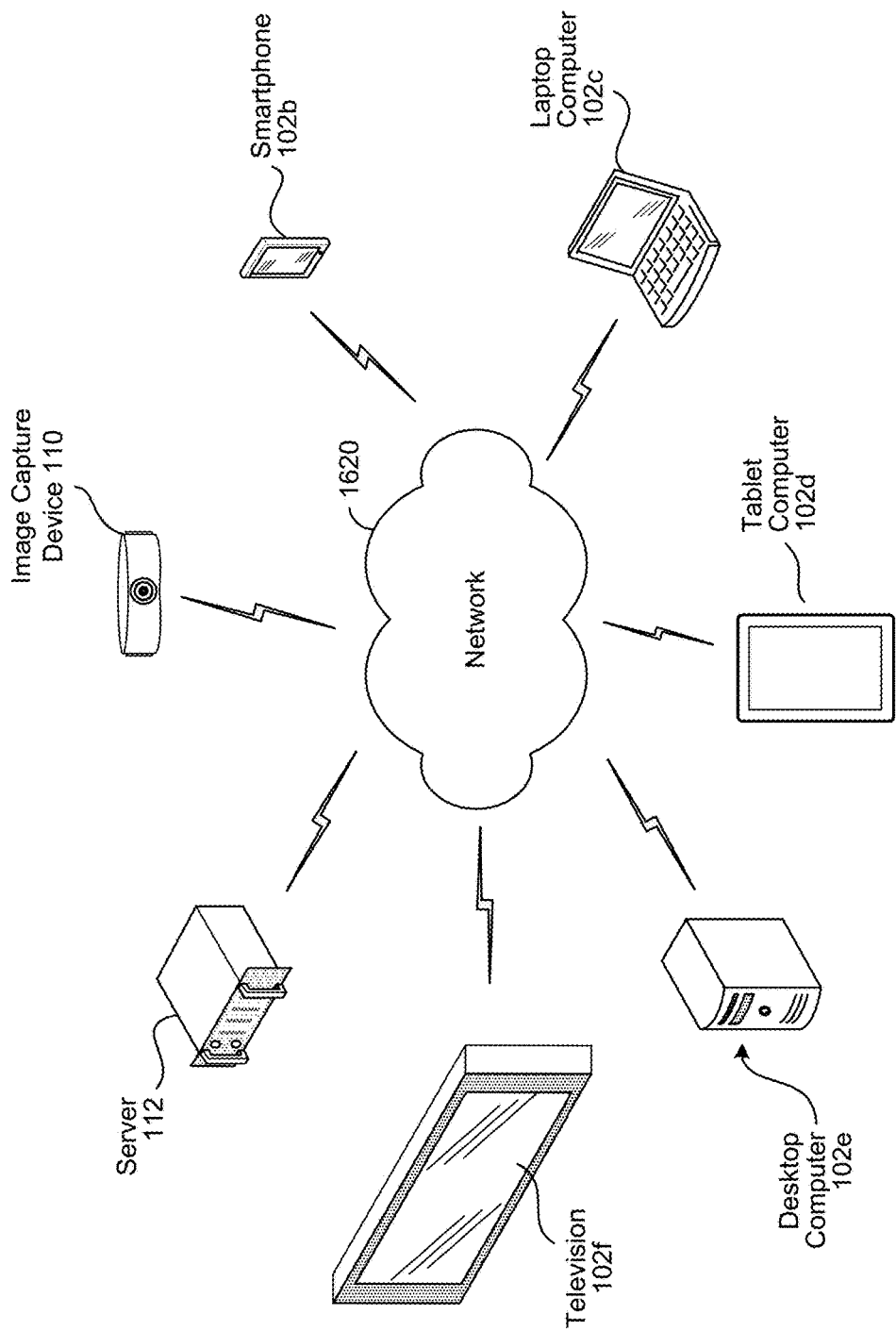
FIG. 17 illustrates an example of a computer network for use with the system.

As shown in FIG. 17, multiple devices may be connected over a network 1620. The network 1620 may include a local or private network or may include a wide network such as the internet. Devices may be connected to the network 1620 through either wired or wireless connections. For example, a smart phone 102b may be connected to the network 1620 through a wireless service provider. Other devices, such as an image capture device 110, laptop computer 102c, tablet computer 102d, desktop computer 102e, television 102f, and/or server(s) 112, may connect to the network 1620 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 14 and/or 15. Alternatively, the server(s) 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating a video summarization, the method comprising:
    receiving input video data comprising a first video clip and a second video clip;
    receiving annotation data comprising first annotation data associated with the first video clip and second annotation data associated with the second video clip, the annotation data indicating characteristics associated with individual frames in the input video data;
    receiving a command to share output video data using a social networking application, the social networking application associated with a first duration of time for video uploads;
    determining a second duration of time by dividing the first duration of time by a first number of video clips included in the input video data;
    determining a first priority metric graph from the first annotation data, the first priority metric graph including a first priority metric associated with a first video frame included in the first video clip, the first priority metric corresponding to a measure of interest in the first video frame;
    identifying a first peak in the first priority metric graph, the first peak corresponding to a highest priority metric included in the first priority metric graph;
    determining first video data using the first priority metric graph, the first video data including a portion of the first video clip corresponding to the second duration of time and to the first peak;
    determining a second priority metric graph from the second annotation data, the second priority metric graph indicating a priority metric associated with individual video frames in the second video clip;
    identifying a second peak in the second priority metric graph;
    determining second video data using the second priority metric graph, the determining further comprising selecting a portion of the second video clip corresponding to the second duration of time and to the second peak; and
    generating output video data that has the first duration and comprises the first video data and the second video data.

2. The computer-implemented method of claim 1, further comprising:
    determining a first video fingerprint indicating characteristics of the first video data;
    determining a second video fingerprint indicating characteristics of the second video data;
    determining a first similarity score between the first video fingerprint and the second video fingerprint, the first similarity score indicating a similarity between the first video data and the second video data;
    determining that the first similarity score is above a threshold;
    determining a third video fingerprint indicating characteristics of the third video data;
    determining a second similarity score between the second video fingerprint and the third video fingerprint, the second similarity score indicating a similarity between the second video data and the third video data;
    determining that the second similarity score is below the threshold;
    determining an order of the output video data, the order indicating that the third video data is to be rendered in the output video data before the second video data; and
    generating the output video data using the order.

3. The computer-implemented method of claim 1, wherein determining the first video data further comprises:
    displaying a first portion of the first video clip, the first portion corresponding to the second duration of time and to the first peak;
    receiving input selecting a second portion of the first video clip;

displaying the second portion of the first video clip, the second portion corresponding to the second duration of time; and selecting the second portion as the first video data.

4. The computer-implemented method of claim 1, further comprising:

determining first weights associated with the annotation data and a third duration of time, a first weight of the first weights indicating a priority associated with a first characteristic of the annotation data;

generating a video summarization using the input video data and the first weights, the video summarization corresponding to the third duration of time and including at least a first portion of the first video clip and a second portion of the second video clip;

receiving the command to generate the output video data from the video summarization, the command including parameters associated with the social networking application;

determining the second duration of time using the parameters;

determining second weights associated with the annotation data and the second duration of time, the second weights indicating a priority associated with individual characteristics of the annotation data, the second weights different than the first weights;

determining the first video data from the first portion of the first video clip using the second weights, the first video data corresponding to the second duration of time; and determining the second video data from the second portion of the second video clip using the second weights, the second video data corresponding to the second duration of time.

5. A computer-implemented method, comprising:

determining a first number of video clips to include in output video data;

determining a first duration of time associated with the output video data;

determining a second duration of time;

receiving a first video clip;

receiving a second video clip;

receiving first annotation data associated with the first video clip;

receiving second annotation data associated with the second video clip;

determining a first priority metric graph from the first annotation data, the first priority metric graph including a first priority metric associated with a first video frame included in the first video clip;

identifying a first peak in the first priority metric graph;

determining first video data using the first priority metric graph by selecting a first portion of the first video clip, the first portion corresponding to the second duration of time and to the first peak;

determining a second priority metric graph from the second annotation data, the second priority metric graph including a second priority metric associated with a second video frame included in the second video clip;

identifying a second peak in the second priority metric graph;

determining second video data using the second priority metric graph by selecting a second portion of the second video clip, the second portion corresponding to the second peak; and generating the output video data comprising the first video data and the second video data.

6. The computer-implemented method of claim 5, further comprising:

determining the second duration of time by dividing the first duration of time by the first number.

7. The computer-implemented method of claim 5, further comprising:

determining first characteristics of the first annotation data;

determining second characteristics of the second annotation data;

determining third characteristics included in the first characteristics and the second characteristics;

determining a theme associated with the third characteristics, the theme indicating at least one of layouts, transitions and special effects that may be applied to eventual video data; and determining third video data using the theme.

8. The computer-implemented method of claim 5, further comprising:

determining a first video fingerprint associated with the first video data;

determining a second video fingerprint associated with the second video data;

determining a first similarity score between the first video fingerprint and the second video fingerprint;

determining that the first similarity score is above a threshold;

determining a third video fingerprint associated with the third video data;

determining a second similarity score between the second video fingerprint and the third video fingerprint;

determining that the second similarity score is below the threshold;

determining an order of the output video data, the order indicating that the third video data is to be rendered in the output video data before the second video data; and generating the output video data using the order.

9. The computer-implemented method of claim 5, further comprising:

identifying a third peak in the second priority metric graph;

selecting a third portion of the second video clip corresponding to the third peak;

determining a first similarity score between the first portion and the third portion;

determining that the first similarity score is above a threshold;

determining a second similarity score between the first portion and the second portion;

determining that the second similarity score is below the threshold; and selecting the second portion as the second video data.

10. The computer-implemented method of claim 5, further comprising:

displaying a second portion of the first video clip, the second portion corresponding to the second duration of time;

receiving input selecting the first portion of the first video clip;

displaying the first portion of the first video clip, the first portion corresponding to the second duration of time; and selecting the first portion as the first video data.

11. The computer-implemented method of claim 5, further comprising:

generating a video summarization, the video summarization associated with a third duration of time and including at least a third portion of the first video clip and a fourth portion of the second video clip;
receiving a command to generate the output video data;
determining the first duration of time based on the command;
determining the first video data from the third portion of the first video clip, the first video data corresponding to the second duration of time; and
determining the second video data from the fourth portion of the second video clip, the second video data corresponding to the second duration of time.

12. The computer-implemented method of claim 11, further comprising:
determining first weights associated with the first annotation data and the third duration of time, a first weight of the first weights indicating a priority associated with a first characteristic of the first annotation data;
generating the video summarization using the first weights;
determining second weights associated with the first annotation data and the first duration of time, a second weight of the second weights indicating a priority associated with the first characteristic, the second weights different than the first weights;
determining the first video data using the second weights; and
determining the second video data using the second weights.

13. A system, comprising:
at least one processor;
a memory device including instructions operable to be executed by the at least one processor to configure the system to perform:
receiving a first video clip;
receiving a second video clip;
receiving first annotation data associated with the first video clip;
receiving second annotation data associated with the second video clip;
determining a first priority metric graph from the first annotation data, the first priority metric graph including a first priority metric associated with a first video frame included in the first video clip;
determining first video data using the first priority metric graph;
determining a second priority metric graph from the second annotation data, the second priority metric graph including a second priority metric associated with a second video frame included in the second video clip;
determining second video data using the second priority metric graph;
determining first characteristics of the first annotation data;
determining second characteristics of the second annotation data;
determining third characteristics included in the first characteristics and the second characteristics;
determining a theme associated with the third characteristics, the theme indicating at least one of layouts, transitions and special effects that may be applied to eventual video data; and
generating, based on the theme, output video data comprising the first video data and the second video data.

14. The system of claim 13, wherein the instructions further configure the system for:
determining a first number of video clips to include in the output video data;
determining a first duration of time associated with the output video data;
determining a second duration of time by dividing the first duration of time by the first number;
identifying a peak in the first priority metric graph; and
selecting a portion of the first video clip corresponding to the second duration of time and to the peak.

15. The system of claim 13, wherein the instructions further configure the system for:
determining a first video fingerprint associated with the first video data;
determining a second video fingerprint associated with the second video data;
determining a first similarity score between the first video fingerprint and the second video fingerprint;
determining that the first similarity score is above a threshold;
determining a third video fingerprint associated with the third video data;
determining a second similarity score between the second video fingerprint and the third video fingerprint;
determining that the second similarity score is below the threshold;
determining an order of the output video data, the order indicating that the third video data is to be rendered in the output video data before the second video data; and
generating the output video data using the order.

16. The system of claim 13, wherein the instructions further configure the system for:
identifying a first peak in the first priority metric graph;
selecting a first portion of the first video clip corresponding to the first peak;
identifying a second peak in the second priority metric graph;
selecting a second portion of the second video clip corresponding to the second peak;
determining a first similarity score between the first portion and the second portion;
determining that the first similarity score is above a threshold;
identifying a third peak in the second priority metric graph;
selecting a third portion of the second video clip corresponding to the third peak;
determining a second similarity score between the first portion and the third portion;
determining that the second similarity score is below the threshold; and
selecting the third portion as the second video data.

17. The system of claim 13, wherein the instructions further configure the system for:
displaying a first portion of the first video clip, the first portion corresponding to a first duration of time;
receiving input selecting a second portion of the first video clip;
displaying the second portion of the first video clip, the second portion corresponding to the first duration of time; and
selecting the second portion as the first video data.

18. The system of claim 13, wherein the instructions further configure the system for:
generating a video summarization, the video summarization associated with a first duration of time and including at least a first portion of the first video clip and a second portion of the second video clip;
receiving a command to generate the output video data;
determining a second duration of time based on the command;
determining the first video data from the first portion of the first video clip, the first video data corresponding to the second duration of time; and
determining the second video data from the second portion of the second video clip, the second video data corresponding to the second duration of time.

19. The system of claim 18, wherein the instructions further configure the system for:
determining first weights associated with the annotation data and the first duration of time, a first weight of the first weights indicating a priority associated with a first characteristic of the annotation data;
generating the video summarization using the first weights;
determining second weights associated with the annotation data and the second duration of time, a second weight of the second weights indicating a priority associated with the first characteristic, the second weights different than the first weights;
determining the first video data using the second weights; and
determining the second video data using the second weights.

* * * * *